(12) United States Patent
Peuhkurinen et al.

(10) Patent No.: US 11,099,381 B2
(45) Date of Patent: Aug. 24, 2021

(54) SYNCHRONIZING LIGHT SOURCES AND OPTICS IN DISPLAY APPARATUSES

(71) Applicant: Varjo Technologies Oy, Helsinki (FI)

(72) Inventors: Ari Antti Erik Peuhkurinen, Helsinki (FI); Ville Ilmari Miettinen, Helsinki (FI)

(73) Assignee: Varjo Technologies Oy, Helsinki (FI)

(*) Notice: Subject to any disclaimer, the term of this patent is extended or adjusted under 35 U.S.C. 154(b) by 0 days.

(21) Appl. No.: 16/929,703

(22) Filed: Jul. 15, 2020

(65) Prior Publication Data

US 2020/0348515 A1 Nov. 5, 2020

Related U.S. Application Data

(63) Continuation-in-part of application No. 16/100,306, filed on Aug. 10, 2018, now abandoned.

(51) Int. Cl.

| | |
|---|---|
| *G02B 27/00* | (2006.01) |
| *G02B 27/01* | (2006.01) |
| *G06T 7/73* | (2017.01) |
| *G06F 3/01* | (2006.01) |
| *G06F 3/0346* | (2013.01) |

(52) U.S. Cl.
CPC ..... *G02B 27/0093* (2013.01); *G02B 27/0101* (2013.01); *G02B 27/0172* (2013.01); *G02B 27/0179* (2013.01); *G06F 3/013* (2013.01); *G06T 7/74* (2017.01); *G02B 2027/0147* (2013.01); *G02B 2027/0187* (2013.01); *G06T 2207/30244* (2013.01)

(58) Field of Classification Search
CPC ............ G02B 27/0093; G02B 27/0179; G02B 27/0172; G02B 2027/0187; G02B 27/0147; G06T 7/74; G06T 2207/30244; G06F 3/013; G06F 3/0346; G06F 3/011
See application file for complete search history.

(56) References Cited

U.S. PATENT DOCUMENTS

| | | | |
|---|---|---|---|
| 10,452,138 B1* | 10/2019 | Sharma | ................ H04N 9/3155 |
| 2010/0056274 A1* | 3/2010 | Uusitalo | .............. G02B 27/017 463/31 |
| 2012/0154277 A1* | 6/2012 | Bar-Zeev | ................ G06F 3/013 345/158 |

(Continued)

*Primary Examiner* — David Tung
(74) *Attorney, Agent, or Firm* — Ziegler IP Law Group, LLC

(57) ABSTRACT

A display apparatus communicably coupled with server arrangement. Display apparatus includes means for tracking user's gaze; means for tracking pose of display apparatus; light source; optical element; and processor. Processor is configured to: process gaze-tracking data; process pose-tracking data; send, to server arrangement, gaze information and apparatus information, server arrangement predicts gaze information and apparatus information, and processes input image to generate image based on predictions; receive, image, predicted gaze information, and predicted apparatus information; determine adjustment required in configuration of light source and optical element prior to displaying image; determine if portion of previous image is to be displayed during adjustment; if yes, display said portion during adjustment; if no, switch off or dim light source during adjustment; display image via light source after adjustment.

16 Claims, 10 Drawing Sheets

(56) References Cited

U.S. PATENT DOCUMENTS

| | | | |
|---|---|---|---|
| 2014/0247277 A1* | 9/2014 | Guenter | G06T 11/40 |
| | | | 345/611 |
| 2014/0313120 A1* | 10/2014 | Kamhi | G06K 9/00604 |
| | | | 345/156 |
| 2016/0240013 A1* | 8/2016 | Spitzer | G02B 27/0179 |
| 2017/0200308 A1* | 7/2017 | Nguyen | G06T 15/005 |
| 2017/0285735 A1* | 10/2017 | Young | G06F 3/013 |
| 2017/0285736 A1* | 10/2017 | Young | G06F 3/013 |
| 2018/0284451 A1* | 10/2018 | Eash | G06T 7/70 |
| 2019/0302883 A1* | 10/2019 | Greer | G06F 3/012 |

* cited by examiner

SYNCHRONIZING LIGHT SOURCES AND OPTICS IN DISPLAY APPARATUSES

CROSS-REFERENCE TO RELATED APPLICATIONS

This application is a continuation-in-part of U.S. patent application Ser. No. 16/100,306, titled "DISPLAY APPARATUS AND METHOD OF DISPLAYING USING GAZE PREDICTION AND IMAGE STEERING" and filed on Aug. 10, 2018, which is incorporated herein by reference.

TECHNICAL FIELD

The present disclosure relates to systems for synchronizing light sources and optics in display apparatuses. Moreover, the present disclosure relates to such display apparatuses. Furthermore, the present disclosure also relates to methods implemented by such display apparatuses.

BACKGROUND

Presentation of interactive extended-reality (XR) environments to users of XR devices is increasingly becoming popular. An XR environment could be a virtual reality (VR) environment, an augmented reality (AR) environment, a mixed reality (MR) environment, and the like. A user generally wears an XR device on his/her head for experiencing the XR environment.

Generally, while using the XR device to view the XR environment, the user's gaze keeps changing. For example, at a given time instant, the user's gaze may be towards a top portion of the XR environment. At a next time instant, the user's gaze may shift towards a central portion of the XR environment. Furthermore, while using the XR device, a pose of the XR device may also keep changing as the user moves his/her head to view the XR environment. For example, at the given time instant, an orientation of the XR device may be upwards. At the next time instant, the orientation of the XR device may change to be straight. Often, a change in the user's gaze is accompanied by a change in the XR device's pose. Therefore, nowadays, the XR devices have started to employ gaze-tracking and pose-tracking to track the user's gaze and the XR device's pose, respectively. Tracking of the user's gaze is impacted by various types of eye movements of the user's eyes. These eye movements are, for example, fixational movements, vergence movements, saccadic movements and pursuit movements.

However, existing XR devices are limited in their ability to employ gaze-tracking and pose-tracking for presenting the XR environment. Firstly, the existing XR devices have limited data processing capabilities to fully utilize gaze-tracking data and pose-tracking data for generating XR images. Secondly, the existing XR devices are unable to properly synchronize their components with changes in the user's gaze and the XR device's pose. As a result, the users of the existing XR devices are often presented unrealistic, distorted views of the XR environment, which considerably lowers the users' viewing experience.

Therefore, in light of the foregoing discussion, there exists a need to overcome the aforementioned drawbacks associated with existing XR devices for presenting XR environments to users.

SUMMARY

The present disclosure seeks to provide a system for synchronizing light sources and optics in a display apparatus. The present disclosure also seeks to provide such a display apparatus. The present disclosure also seeks to provide a method implemented by such a display apparatus. The present disclosure seeks to provide a solution to the existing problems of limited data processing capabilities and suboptimal immersiveness in existing extended-reality devices. An aim of the present disclosure is to provide a solution that overcomes at least partially the problems encountered in the prior art, and to provide a display apparatus that effectively utilizes gaze-tracking data and pose-tracking data for generation and presentation of realistic and immersive extended-reality images.

In one aspect, an embodiment of the present disclosure provides a display apparatus, communicably coupled with a server arrangement via a data communication network, comprising:
means for tracking a user's gaze;
means for tracking a pose of the display apparatus;
at least one light source;
at least one optical element; and
a processor configured to:
  process gaze-tracking data, collected by the means for tracking the user's gaze, to determine a gaze position, a gaze direction, a gaze velocity and a gaze acceleration per eye of the user;
  process pose-tracking data, collected by the means for tracking the pose of the display apparatus, to determine a position, an orientation, a velocity and an acceleration of the display apparatus;
  send, to the server arrangement, gaze information indicative of the gaze position, the gaze direction, the gaze velocity and the gaze acceleration of the user, and apparatus information indicative of the position, the orientation, the velocity and the acceleration of the display apparatus, wherein the server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus;
  receive, from the server arrangement, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus;
  determine an adjustment to be made in a configuration of the at least one light source and the at least one optical element prior to displaying the at least one image, based on the predicted gaze information and the predicted apparatus information;
  determine whether or not a portion of at least one previous image is to be displayed during the adjustment;
  when it is determined that the portion of the at least one previous image is to be displayed, display the portion of the at least one previous image via the at least one light source, whilst making the adjustment in the configuration of the at least one light source and the at least one optical element;

when it is determined that no portion of the at least one previous image is to be displayed, switch off or dim the at least one light source, whilst making the adjustment in the configuration of the at least one light source and the at least one optical element; and display the at least one image via the at least one light source after the adjustment is made.

In another aspect, an embodiment of the present disclosure provides a method implemented by a display apparatus that is communicably coupled with a server arrangement via a data communication network, the display apparatus comprising means for tracking a user's gaze, means for tracking a pose of the display apparatus, at least one light source and at least one optical element, the method comprising:

processing gaze-tracking data, collected by the means for tracking the user's gaze, to determine a gaze position, a gaze direction, a gaze velocity and a gaze acceleration per eye of the user;

processing pose-tracking data, collected by the means for tracking the pose of the display apparatus, to determine a position, an orientation, a velocity and an acceleration of the display apparatus;

sending, to the server arrangement, gaze information indicative of the gaze position, the gaze direction, the gaze velocity and the gaze acceleration of the user, and apparatus information indicative of the position, the orientation, the velocity and the acceleration of the display apparatus, wherein the server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus;

receiving, from the server arrangement, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus;

determining an adjustment to be made in a configuration of the at least one light source and the at least one optical element prior to displaying the at least one image, based on the predicted gaze information and the predicted apparatus information;

determining whether or not a portion of at least one previous image is to be displayed during the adjustment;

when it is determined that the portion of the at least one previous image is to be displayed, displaying the portion of the at least one previous image via the at least one light source, whilst making the adjustment in the configuration of the at least one light source and the at least one optical element;

when it is determined that no portion of the at least one previous image is to be displayed, switching off or dimming the at least one light source, whilst making the adjustment in the configuration of the at least one light source and the at least one optical element; and displaying the at least one image via the at least one light source after the adjustment is made.

In yet another aspect, an embodiment of the present disclosure provides a system comprising a server arrangement communicably coupled with a display apparatus via a data communication network, the display apparatus comprising means for tracking a user's gaze, means for tracking a pose of the display apparatus, at least one light source, at least one optical element and a processor, wherein the processor is configured to process gaze-tracking data to determine a gaze position, a gaze direction, a gaze velocity and a gaze acceleration per eye of the user, and process pose-tracking data to determine a position, an orientation, a velocity and an acceleration of the display apparatus, wherein the server arrangement is configured to:

receive, from the display apparatus, gaze information indicative of the gaze position, the gaze direction, the gaze velocity and the gaze acceleration of the user, and apparatus information indicative of the position, the orientation, the velocity and the acceleration of the display apparatus;

predict a gaze position, a gaze direction, a gaze velocity and a gaze acceleration per eye of the user, based on the gaze information;

predict a position, an orientation, a velocity and an acceleration of the display apparatus based on the apparatus information;

process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus; and send, to the display apparatus, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus, wherein the processor of the display apparatus is configured to:

determine an adjustment to be made in a configuration of the at least one light source and the at least one optical element prior to displaying the at least one image, based on the predicted gaze information and the predicted apparatus information;

determine whether or not a portion of at least one previous image is to be displayed during the adjustment;

when it is determined that the portion of the at least one previous image is to be displayed, display the portion of the at least one previous image via the at least one light source, whilst making the adjustment in the configuration of the at least one light source and the at least one optical element;

when it is determined that no portion of the at least one previous image is to be displayed, switch off or dim the at least one light source, whilst making the adjustment in the configuration of the at least one light source and the at least one optical element; and display the at least one image via the at least one light source after the adjustment is made.

Embodiments of the present disclosure substantially eliminate or at least partially address the aforementioned problems in the prior art, and enable efficient and accurate synchronization of light sources and optics in display apparatuses to present realistic visual scenes to users.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 6C illustrates the second image to be displayed, while

FIG. 7A is an example illustration of a distorted image, in accordance with an embodiment of the present disclosure; while

Figure 1:
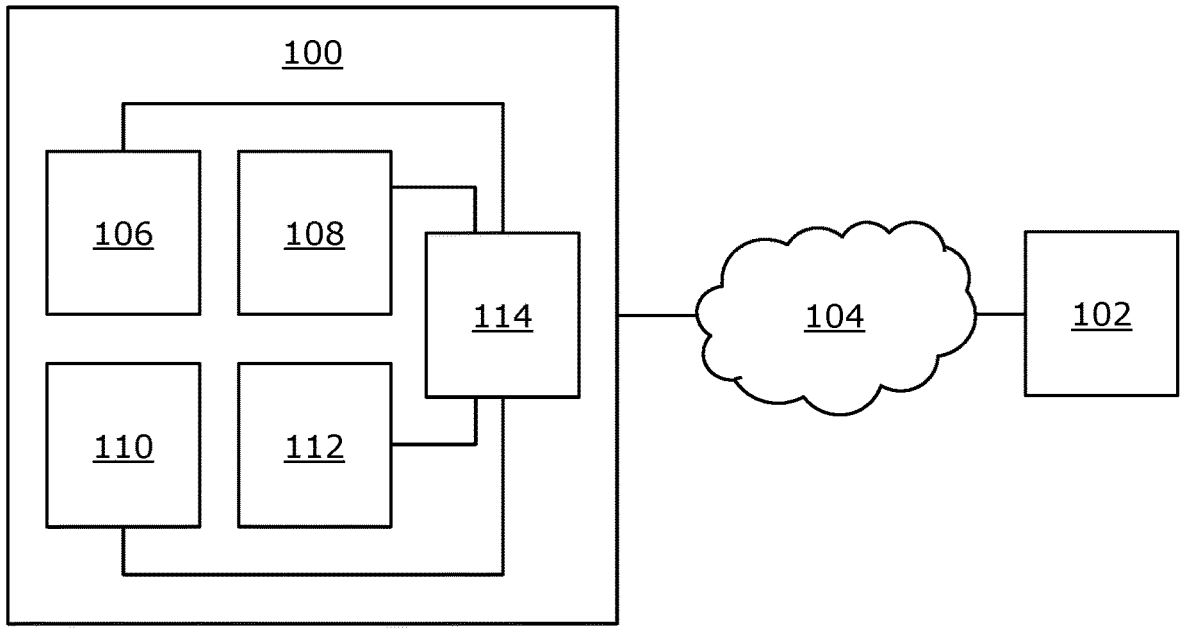
FIG. 1 illustrates a block diagram of an architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus, communicably coupled with a server arrangement via a data communication network, comprising:
means for tracking a user's gaze;
means for tracking a pose of the display apparatus;
at least one light source;
at least one optical element; and
a processor configured to:
  process gaze-tracking data, collected by the means for tracking the user's gaze, to determine a gaze position, a gaze direction, a gaze velocity and a gaze acceleration per eye of the user;
  process pose-tracking data, collected by the means for tracking the pose of the display apparatus, to determine a position, an orientation, a velocity and an acceleration of the display apparatus;
  send, to the server arrangement, gaze information indicative of the gaze position, the gaze direction, the gaze velocity and the gaze acceleration of the user, and apparatus information indicative of the position, the orientation, the velocity and the acceleration of the display apparatus, wherein the server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus;
  receive, from the server arrangement, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus;

determine an adjustment to be made in a configuration of the at least one light source and the at least one optical element prior to displaying the at least one image, based on the predicted gaze information and the predicted apparatus information;

determine whether or not a portion of at least one previous image is to be displayed during the adjustment;

when it is determined that the portion of the at least one previous image is to be displayed, display the portion of the at least one previous image via the at least one light source, whilst making the adjustment in the configuration of the at least one light source and the at least one optical element;

when it is determined that no portion of the at least one previous image is to be displayed, switch off or dim the at least one light source, whilst making the adjustment in the configuration of the at least one light source and the at least one optical element; and display the at least one image via the at least one light source after the adjustment is made.

In another aspect, an embodiment of the present disclosure provides a method implemented by a display apparatus that is communicably coupled with a server arrangement via a data communication network, the display apparatus comprising means for tracking a user's gaze, means for tracking a pose of the display apparatus, at least one light source and at least one optical element, the method comprising:

processing gaze-tracking data, collected by the means for tracking the user's gaze, to determine a gaze position, a gaze direction, a gaze velocity and a gaze acceleration per eye of the user;

processing pose-tracking data, collected by the means for tracking the pose of the display apparatus, to determine a position, an orientation, a velocity and an acceleration of the display apparatus;

sending, to the server arrangement, gaze information indicative of the gaze position, the gaze direction, the gaze velocity and the gaze acceleration of the user, and apparatus information indicative of the position, the orientation, the velocity and the acceleration of the display apparatus, wherein the server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus;

receiving, from the server arrangement, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus;

determining an adjustment to be made in a configuration of the at least one light source and the at least one optical element prior to displaying the at least one image, based on the predicted gaze information and the predicted apparatus information;

determining whether or not a portion of at least one previous image is to be displayed during the adjustment;

when it is determined that the portion of the at least one previous image is to be displayed, displaying the portion of the at least one previous image via the at least one light source, whilst making the adjustment in the configuration of the at least one light source and the at least one optical element;

when it is determined that no portion of the at least one previous image is to be displayed, switching off or dimming the at least one light source, whilst making the adjustment in the configuration of the at least one light source and the at least one optical element; and displaying the at least one image via the at least one light source after the adjustment is made.

In yet another aspect, an embodiment of the present disclosure provides a system comprising a server arrangement communicably coupled with a display apparatus via a data communication network, the display apparatus comprising means for tracking a user's gaze, means for tracking a pose of the display apparatus, at least one light source, at least one optical element and a processor, wherein the processor is configured to process gaze-tracking data to determine a gaze position, a gaze direction, a gaze velocity and a gaze acceleration per eye of the user, and process pose-tracking data to determine a position, an orientation, a velocity and an acceleration of the display apparatus, wherein the server arrangement is configured to:

receive, from the display apparatus, gaze information indicative of the gaze position, the gaze direction, the gaze velocity and the gaze acceleration of the user, and apparatus information indicative of the position, the orientation, the velocity and the acceleration of the display apparatus;

predict a gaze position, a gaze direction, a gaze velocity and a gaze acceleration per eye of the user, based on the gaze information;

predict a position, an orientation, a velocity and an acceleration of the display apparatus based on the apparatus information;

process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus; and send, to the display apparatus, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus, wherein the processor of the display apparatus is configured to:

determine an adjustment to be made in a configuration of the at least one light source and the at least one optical element prior to displaying the at least one image, based on the predicted gaze information and the predicted apparatus information;

determine whether or not a portion of at least one previous image is to be displayed during the adjustment;

when it is determined that the portion of the at least one previous image is to be displayed, display the portion of the at least one previous image via the at least one light source, whilst making the adjustment in the configuration of the at least one light source and the at least one optical element;

when it is determined that no portion of the at least one previous image is to be displayed, switch off or dim the at least one light source, whilst making the adjustment in the configuration of the at least one light source and the at least one optical element; and display the at least one image via the at least one light source after the adjustment is made.

The configuration of the at least one light source and the at least one optical element according to the user's gaze and the display apparatus's pose is synchronized. Data processing capabilities of the processor of the display apparatus are supplemented by the server arrangement, to fully utilize gaze-tracking data and pose-tracking data for generating images. In particular, some of the required processing tasks are performed by the server arrangement and the remaining processing tasks are performed by the processor. Prediction of the gaze information and the apparatus information is employed to generate the image, and to effectively synchronize the configuration prior to displaying the image. By such synchronization, the display apparatus effectively emulates active foveation of a human visual system whilst presenting a visual scene to a user. Moreover, the display apparatus also accommodates various types of eye movements during the presentation of the visual scene. Beneficially, the method is logical and effective. The system has powerful processing capabilities, is reliable, easy to implement, and is robust.

Throughout the present disclosure, the term "display apparatus" refers to a specialized equipment that is employed to present an extended-reality (XR) environment to the user when the display apparatus in operation is worn by the user on his/her head. The display apparatus acts as a device (for example, such as an XR headset, a pair of XR glasses, and the like) that is operable to present a visual scene of an XR environment to the user. It will be appreciated that the term "extended reality" encompasses virtual reality (VR), augmented reality (AR), mixed reality (MR), and the like. In an example, the visual scene may be a virtual reality movie. In another example, the visual scene may be an educational augmented reality video. In yet another example, the visual scene may be a mixed reality game.

The server arrangement comprises one or more servers. The data communication network can be an individual network, or a collection of individual networks that are interconnected with each other to function as a single large network. The data communication network may be wired, wireless, or a combination thereof. Examples of the individual networks include, but are not limited to, Local Area Networks (LANs), Wide Area Networks (WANs), the Internet, radio networks, telecommunication networks, and Worldwide Interoperability for Microwave Access (WiMAX) networks. It will be appreciated that the data communication network facilitates communicable coupling between the display apparatus and the server arrangement.

Throughout the present disclosure, the term "means for tracking the user's gaze" refers to specialized equipment for detecting and/or following the gaze of the user, when the display apparatus in operation is worn by the user. Optionally, the means for tracking the user's gaze is implemented by way of contact lenses with sensors, cameras monitoring the position of the pupil of the user's eye, and the like. Such means for tracking the user's gaze are well-known in the art. As an example, the means for tracking the user's gaze may be implemented by way of at least one illuminator for emitting light to illuminate the user's eyes when the display apparatus is worn by the user on his/her head, and at least one image sensor for capturing images of reflections of the light from the user's eyes. Such images represent the pupils of the user's eyes and the reflections of the emitted light from the user's eyes. The at least one illuminator may emit light of infrared wavelength, near-infrared wavelength, or visible wavelength. The at least one illuminator may be implemented as a light emitting diode (LED), a laser, a light projector, at least one pixel of the at least one light source.

Throughout the present disclosure, the term "means for tracking the pose of the display apparatus" refers to specialized equipment that is employed to detect and/or follow the pose (namely, a position and an orientation) of the display apparatus within a real-world environment. Optionally, the means for tracking the pose of the display apparatus is implemented as a true six Degrees of Freedom (6DoF) tracking system. Said means could be implemented as an internal component of the display apparatus, as a tracking system external to the display apparatus, or as a combination thereof. Optionally, the means for tracking the pose of the display apparatus is optionally implemented as at least one of: an accelerometer, a gyroscope, a magnetometer, an Inertial Measurement Unit (IMU), a Timing and Inertial Measurement Unit (TIMU), a marker-less inside-out tracking system, at least one detector that is employed to detect at least one detectable object, a marker-less outside-in tracking system. Optionally, when the at least one detectable object is arranged in the real-world environment, the at least one detector is arranged on the display apparatus, and vice versa. Optionally, the at least one detectable object is implemented as at least one marker (for example, such as an active infra-red (IR) LED, a visible LED, a laser illuminator, a Quick Response (QR) code, an ArUco marker, a Radio Frequency Identification (RFID) marker, and the like), whereas the at least one detector is implemented as at least one of: an IR camera, an IR transceiver, a visible light camera, an RFID reader. In an example, the means for tracking the pose of the display apparatus may be implemented as an infrared signal-based tracking system (for example, such as Valve Corporation's SteamVR® tracking system). In another example, the means for tracking the pose of the display apparatus may be implemented as a magnetic tracking system (for example, such as magnetic tracking from Polhemus). In yet another example, the means for tracking the pose of the display apparatus may be implemented as an optical outside-in tracking system (for example, such as OptiTrack™ and ART tracking).

It will be appreciated that tracking of the user's gaze and/or the display apparatus's pose is typically performed at a high frequency (for example, such as 1000 Hertz).

Throughout the present disclosure, the term "light source" refers to an element from which light emanates. Optionally, a given light source is implemented as a display. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, a given light source is implemented as a projector. In this regard, a given XR image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

In some implementations, the at least one light source comprises a single light source that is used on a shared basis for both eyes of the user. In other implementations, the at least one light source at least one first light source and at least one second light source that are used for a first eye and a second eye of the user, respectively.

The configuration of the at least one light source and the at least one optical element (namely, optics) facilitates the display of the at least one image at the display apparatus. Hereinafter, the "configuration of the at least one light source and the at least one optical element" has been referred to as "configuration", for the sake of convenience only.

It will be appreciated that the at least one optical element may be implemented in several ways. In some implementations, the at least one optical element comprises an optical combiner. In other implementations, the at least one optical element comprises an optical shutter or mask that selectively allows a portion of a plurality of projections of an image to pass therethrough. In yet other implementations, the at least one optical element comprises a variable-angular-resolution (VAR) optical element. These implementations are described later in detail.

It will be appreciated that in operation, various components of the display apparatus functionally cooperate with each other, to provide the user with a seamless viewing experience. In particular, the configuration is adjusted in a synchronized manner according to the user's gaze and the display apparatus's pose, to enhance the user's experience of visual scene. This synchronization also accommodates various types of eye movements during the presentation of the visual scene. Moreover, said manner of operation necessitates the various components of the display apparatus to be operatively synchronized with one another, for example, via a communicable coupling therebetween. Optionally, the components of the display apparatus are operatively coupled with each other via the processor of the display apparatus. The processor acts as an intermediary device that manages operational synchronism between the components of the display apparatus. Additionally or alternatively, optionally, the components of the display apparatus are operatively coupled with each other via a common bus. Yet additionally or alternatively, the components of the display apparatus are directly coupled with each other. Therefore, even though the components of the display apparatus operate separately, the communicable coupling therebetween enables them to work in the synchronized manner.

Throughout the present disclosure, the term "gaze-tracking data" refers to sensor data collected by the means for tracking the user's gaze, and the term "pose-tracking data" refers to sensor data collected by the means for tracking the pose of the display apparatus. Optionally, when processing the gaze-tracking data and/or when processing the pose-tracking data, the processor employs at least one data processing algorithm. Such processing of the gaze-tracking data and the processing of the pose-tracking data is well-known in the art. Examples of the at least one data processing algorithm include, but are not limited to:
- a data filtering algorithm (for example, such as a Kalman filtering algorithm, a Least Mean Squares (LMS) algorithm, and the like),
- an image processing algorithm (for example, such as an image sharpening algorithm, an image brightening algorithm, and the like),
- a machine learning algorithm (for example, such as a pattern recognition algorithm, an edge and/or a feature detection algorithm, and the like),
- a computer vision algorithm (for example, such as an object recognition algorithm, an object tracking algorithm, and the like), and
- a mathematical algorithm (for example, such as a geometric algorithm, a statistical analysis algorithm, and the like).

The processor receives, from the server arrangement, the at least one image, the predicted gaze information, and the predicted apparatus information, in parts or all at once. As an example, the predicted gaze information and the predicted apparatus information may be received earlier in time (as they do not require further processing by the server arrangement), and the at least one image may be received later in time (as it may require more processing at the server arrangement).

Optionally, when determining the adjustment to be made in the configuration, the processor is configured to determine a type of the adjustment, and an extent (namely, magnitude) of the adjustment. The adjustment is made to synchronize said configuration according to the predicted gaze information and the predicted apparatus information, so that when the at least one image is displayed, said configuration is well-aligned according to the user's gaze and the display apparatus's pose. Herein, the term "adjustment" encompasses various types of adjustments such as mechanical adjustment (for example, such as tilting, shifting or rotating), electromechanical adjustment (for example, of an optical shutter or mask), and similar. It will be appreciated that the adjustment enables the display apparatus to emulate active foveation while presenting the visual scene to the user. Optionally, the processor is configured to employ at least one mathematical formula for determining the adjustment to be made in the configuration of the at least one light source and the at least one optical element.

In an example, a current gaze information and a current apparatus information may indicate a current gaze position of the user to be at a center of the visual scene and a current orientation of the display apparatus to be straight. When the predicted gaze information and the predicted apparatus information indicate a predicted gaze position of the user to be at a top portion of the visual scene and a predicted orientation of the display apparatus to be upwards, the processor may determine that a mechanical adjustment of tilting the at least one light source by 10 degrees is required to be made in the configuration.

Optionally, the adjustment to be made in the configuration does not require movement of the at least one light source and/or the at least one optical element.

It will be appreciated that the configuration includes several components, depending on the implementation of the display apparatus. At least one component of the configuration may require adjustment prior to displaying the at least one image. Different configurations corresponding to different implementations of the display apparatus are described later in more detail.

Optionally, the processor is configured to determine whether or not the portion of the at least one previous image is to be displayed during the adjustment, based on at least one of: the type of the adjustment, the extent of the adjustment. Notably, a time period required for the adjustment depends on the type of the adjustment and/or the extent of the adjustment. Typically, the time period required for the adjustment is of the order of a couple of milliseconds (for example, such as 2 milliseconds), whereas at least one new image is displayed every few milliseconds (for example, such as 10 milliseconds for a frame rate of 100 frames per second). Optionally, the portion of the at least one previous image is determined to be displayed during the adjustment, when the time period required for the adjustment is equal to or greater than 1 millisecond.

Herein, the "portion of at least one previous image" is a select part of the at least one previous image. When, for example, the at least one previous image comprises a plurality of previous images, the portion of the at least one previous image may be a previous image (such as a previous first image) amongst the plurality of previous images. Alternatively, for example, the portion of the at least one previous image may be a specific region of the at least one previous image (such as a region representing a background of the visual scene, a region representing non-moving objects in the visual scene, and the like).

In an example, the at least one previous image may comprise two previous images X1 and X2, wherein the two previous images X1 and X2 are previously displayed simultaneously via different light sources Y1 and Y2, respectively. In a case when the adjustment to be made in the configuration is a mechanical adjustment of the light source Y2, the processor may determine that the previous image X1 is to be displayed during the adjustment. In another case when the adjustment to be made in the configuration is a mechanical adjustment of both the light sources Y1 and Y2, the processor may determine that none of the previous images X1 and X2 are to be displayed during the adjustment.

In another example, when a major adjustment is required to be made in the configuration, the processor may determine that no portion of at least one previous image is to be displayed during the adjustment. A time period required for such major adjustment may be quite long.

Optionally, the portion of the at least one previous image is displayed for an entirety of the time period required for the adjustment. It will be appreciated that displaying the portion of the at least one previous image, whilst making the adjustment in the configuration, enables the display apparatus to provide an uninterrupted viewing experience to the user even during the adjustment. Such displaying enables smoother transition between successive image frames of the visual scene. Moreover, such displaying also reduces flickering within the display apparatus.

It will be appreciated that when it is determined that no portion of the at least one previous image is to be displayed, switching off or dimming the at least one light source, whilst making the adjustment in the configuration, enables the display apparatus to avoid presenting an optically distorted visual scene to the user during the adjustment. Whilst the adjustment is being made in the configuration, the user's gaze and/or the display apparatus's pose is changing with respect to the configuration. Therefore, the configuration may be improperly configured and/or aligned with respect to the user's gaze and/or the display apparatus's pose. In such a case, switching off or dimming the at least one light source whilst making the adjustment prevents the user's viewing experience from becoming sub-standard or non-immersive, and additionally, enables power saving within the display apparatus.

Optionally, the processor sends a control signal to the at least one light source for switching off or dimming the at least one light source during the time period of the adjustment. After the adjustment is made, the processor sends, to the at least one light source, a control signal to display the at least one image. Since the adjustment is made according to the predicted gaze information and the predicted apparatus information, the configuration is well-synchronized with the user's gaze and the display apparatus's pose at the time of displaying. As a result, the at least one image, when displayed, appears gaze-consistent and pose-consistent to the user of the display apparatus. This improves immersion of the user in the visual scene, and enhances the user's viewing experience.

Optionally, when the at least one image comprises a plurality of images, each of the plurality of images is displayed simultaneously. This avoids time lag in optical combination of projections of the plurality of images, thereby providing the user with a seamless viewing experience of the visual scene.

Optionally, the processor is configured to:
predict a gaze position, a gaze direction, a gaze velocity and a gaze acceleration per eye of the user for a time instant at which the at least one image is to be displayed, based on newly-collected gaze-tracking data;
predict a position, an orientation, a velocity and an acceleration of the display apparatus for the time instant at which the at least one image is to be displayed, based on newly-collected pose-tracking data; and
post-process the at least one image prior to displaying via the at least one light source, based on the predicted gaze position, the predicted gaze direction, the predicted gaze velocity and the predicted gaze acceleration, and the predicted position, the predicted orientation, the predicted velocity and the predicted acceleration of the display apparatus.

It will be appreciated that it is beneficial to make the aforesaid predictions when there is a time-lag between the server arrangement and the display apparatus. While the at least one image is generated and subsequently sent from the server arrangement to the processor, the user's gaze and/or the display apparatus's pose may keep changing. Presence of the aforesaid time-lag may cause the at least one image generated by the server arrangement to become outdated by the time the at least one image is to be displayed. At the time of displaying the at least one image, the user's gaze and/or the display apparatus's pose may have changed in an unexpected manner that is different from the predictions made by the server arrangement. Displaying outdated image(s) is undesirable, as it can lead to lowering of the user's viewing experience. Therefore, the processor optionally employs the newly-collected gaze-tracking data and the newly-collected pose-tracking data for making the aforesaid predictions again (they are made earlier by the server arrangement), as the newly-collected gaze-tracking data and the newly-collected pose-tracking data is collected later in time and is likely to be more accurate compared to the gaze-tracking data and the pose-tracking data collected earlier. Making the predictions in multiple phases improves quality of the predictions. The processor optionally post-processes the at least one image prior to displaying, based on the (latest) predictions made by the processor, to ensure that the at least one image is up-to-date and consistent with the user's gaze and the display apparatus's pose at the time instant of displaying the at least one image.

Optionally, the processor predicts the gaze position, the gaze direction, the gaze velocity and the gaze acceleration per eye of the user for the time instant at which the at least one image is to be displayed, based also on the predicted gaze information received from the server arrangement. Likewise, optionally, the processor predicts the position, the orientation, the velocity and the acceleration of the display apparatus for the time instant at which the at least one image is to be displayed, based also on the predicted apparatus information received from the server arrangement.

It will be appreciated that any predicted parameter (for example, such as the predicted gaze information, the predicted gaze direction, the predicted position of the display apparatus, the predicted orientation of the display apparatus, and similar) encompasses the prediction made by the server arrangement as well as the prediction made by the display apparatus.

When post-processing the at least one image prior to displaying, the processor is configured to employ at least one image post-processing algorithm. Such post-processing of the at least one image is performed, for example, to make the at least one image suitably for displaying at the at least one light source, correcting defects in the at least one image, enhancing realism in the at least one image, and the like. The at least one image post-processing algorithm pertains to at least one of:

distortion and color correction of the at least one image (for example, to adjust image content to fit to a setup of the at least one light source and the at least one optical element), reprojection of the at least one image based on the predicted pose of the display apparatus (for example, using projection matrices), shifting moving objects shown in the visual scene based on motion prediction (for example, the server arrangement could perform motion prediction, while the processor of the display apparatus could shift pixel segments representing the moving objects, based on the motion prediction).

In an embodiment, the at least one image comprises a first image having a first resolution and a second image having a second resolution, the second resolution being higher than the first resolution, the at least one light source comprising a first light source and a second light source, the at least one optical element being implemented as at least one optical combiner, wherein the processor is configured to determine, based on the predicted gaze position and the predicted gaze direction, a region of the at least one optical combiner onto which a projection of the second image emanating from the second light source is to be focused, wherein the adjustment is made to focus the projection of the second image on said region of the at least one optical combiner, whereby a projection of the first image emanating from the first light source superimposes with the projection of the second image to present a visual scene to the user. In such a case, the first image is displayed at the first image source, whereas the second image is displayed at the second image source.

Optionally, the server arrangement is configured to:

determine a region of interest of the input image, based upon the predicted gaze position and the predicted gaze direction; and generate the first image and the second image, wherein the second image corresponds to the region of interest of the input image, while the first image corresponds to a region of the input image that includes and surrounds the region of interest.

The "region of interest" of the input image is a region of the input image that corresponds to the predicted gaze position and the predicted gaze direction. In some implementations, the first image corresponds to only the region of the input image that includes and surrounds the region of interest, whereas in other implementations, the first image corresponds to an entirety of the input image.

Optionally, the region of the at least one optical combiner onto which the projection of the second image is to be focused is determined based on a location of the region of interest within the input image, wherein the location of the region of interest within the input image depends on the predicted gaze position and the predicted gaze direction.

Optionally, the projections of the first and second images are optically combined in a manner that the projection of the second image is incident upon a fovea of the user's eye, whereas the projection of the first image is incident upon a remaining region of the retina of the user's eye. Throughout the present disclosure, the term "optical combiner" refers to an optical component for optically combining the projection of the first image with the projection of the second image. Upon making the adjustment in the configuration, the projection of the second image is accurately focused onto the required region of the at least one optical combiner. As a result, the projection of the first image accurately superimposes with the projection of the second image to form a combined projection, wherein the visual scene presented by the combined projection emulates foveation characteristics of the human visual system. A portion of the visual scene corresponding to the region of interest has high visual detail (as said portion is formed by the projection of the second image having the second resolution), whereas a remaining portion of the visual scene has relatively lower visual detail (as said portion is formed by the projection of the first image having the first resolution).

Optionally, when generating the first image, the server arrangement is configured to reduce an intensity of a region of the first image that corresponds to the region of interest, the intensity of said region of the first image being reduced with respect to an intensity of the region of interest of the input image, wherein, when generating the second image, the server arrangement is configured to adjust an intensity of the second image according to the intensity of said region of the first image. It will be appreciated that the intensity of the second image is to be adjusted in a manner that, when superimposed, the projection of the second image and the projection of said region of the first image appear to have the intensity of the region of interest of the input image. As a result, a resultant intensity of pixels corresponding to the region of interest in the visual scene lies within a predefined threshold (for example, +/−10 percent) from an original intensity of pixels within the region of interest in the input image, thereby accurately mimicking the original intensity of the region of interest in the input image. Techniques for adjusting intensities of the first image and the second image are described in U.S. patent application Ser. No. 16/223,657 and U.S. patent application Ser. No. 16/505,982, which are incorporated herein by reference.

Optionally, the at least one optical combiner is arranged for any of: allowing the projection of the first image to pass through, whilst reflecting the projection of the second image; or allowing the projection of the second image to pass through, whilst reflecting the projection of the first image. The at least one optical combiner is arranged to combine optical paths of the projections of the first and second images. Optionally, the at least one optical combiner is implemented by way of at least one of: a lens, a mirror, a semi-transparent mirror, a semi-transparent film, a semi-transparent flexible membrane, a prism, a lens, a beam splitter, an optical waveguide, a polarizer.

Optionally, the display apparatus further comprises an image steering unit, wherein the processor is configured to control the image steering unit to make the adjustment in the configuration for focusing the projection of the second image on the required region of the at least one optical combiner. Optionally, in this regard, the image steering unit mechanically adjusts at least one of: the first light source, the second light source, the at least one optical combiner. Such mechanical adjustment comprises at least one of: shifting (namely, translating), tilting, rotating, in one or more dimensions. The image steering unit controls a location of focusing the projection of the second image onto the at least one optical combiner. Optionally, the image steering unit comprises at least one actuator. Herein, the term "actuator" refers to an equipment that is employed to rotate, tilt and/or shift a component with which it is associated. The at least one actuator may, for example, include electrical components, mechanical components, magnetic components, polymeric components and so forth. Such an actuator is driven by an actuation signal. It will be appreciated that the actuation signal could be a piezoelectric force, an electromagnetic force, a mechanical torque, an electric current, a hydraulic pressure, a pneumatic pressure or similar.

In another embodiment, the at least one image comprises a first image having a first resolution and a second image having a second resolution, the second resolution being higher than the first resolution, the at least one light source comprising a first light source and a second light source, wherein the at least one optical element is implemented as at least one optical shutter or mask, wherein the adjustment is made by electrically controlling the at least one optical shutter or mask to selectively allow a portion of a plurality of projections of the second image emanating from the second light source to pass therethrough, based on the predicted gaze position and the predicted gaze direction, whereby said portion of the plurality of projections of the second image superimposes with a projection of the first image emanating from the first light source to present a visual scene to the user.

Optionally, the display apparatus further comprises:
an array of micro-prisms arranged in a proximity of an image rendering surface of the second light source, wherein the micro-prisms of the array split light emanating from pixels of the second light source into a plurality of directions to produce the plurality of projections of the second image; or
a group of reflective elements arranged to split light emanating from the second light source into a plurality of directions to produce the plurality of projections of the second image, wherein at least two reflective elements of said group have different reflectance.

Optionally, the number of directions in the plurality of directions is greater than or equal to 2. Optionally, an angle between two adjacent directions depends upon a distance between the components of the display apparatus and a required field of view of the display apparatus. It will be appreciated that the plurality of projections of the second image form a plurality of non-overlapping copies of the second image on an imaginary plane arranged on the optical path of said projections. Optionally, the plurality of projections of the second image are produced in a tiled layout. As an example, the tiled layout could be a rectangular tiled layout or a hexagonal tiled layout. It will be appreciated that the tiled layout may be a circular tiled layout, an elliptical tiled layout, and the like.

Optionally, the array of micro-prisms is implemented such that each micro-prism of the array corresponds to at least one pixel of the second light source. Optionally, the array of micro-prisms comprises a single micro-prism that corresponds to an entirety of pixels of the second light source. Optionally, a given micro-prism of the array of micro-prisms has a wedge-like shape. In other words, the given micro-prism has a plurality of faces, wherein the plurality of faces comprise at least one input face wherefrom light enters the given micro-prism and at least one output face wherefrom light exits the given micro-prism, a given input face and a given output face having a shallow angle (namely, an optical wedge) therebetween. It will be appreciated that a given face of the given micro-prism could be planar, curved, or freeform. As an example, the given micro-prism may have a single input face and nine output faces. The single input face may be arranged to face the at least one corresponding pixel of the second light source, while the nine output faces may be arranged to direct light emanating from the at least one corresponding pixel into nine different directions.

Optionally, the reflective elements of the group of reflective elements are implemented by way of at least two of: partially-reflective mirrors, fully-reflective mirrors, partially-reflective lenses, fully-reflective lenses, partially-reflective prisms, fully-reflective prisms. Optionally, the group of reflective elements comprises a set of L reflective elements that are arranged in a sequential manner, wherein L is selected from the group consisting of 2, 3, 4 and 5. Optionally, the group of reflective elements further comprises L sets of M reflective elements each, reflective elements of each set being arranged in a sequential manner, wherein M is selected from the group consisting of 2, 3, 4 and 5, and wherein a given set from amongst the L sets is arranged on an optical path of light reflected by a given reflective element of the set of L reflective elements. Optionally, for a given set of N reflective elements, a first reflective element of the given set has a reflectance of $1/N$, a second reflective element of the given set has a reflectance of $1/(N-1)$, an N−1th reflective element of the given set has a reflectance of $\frac{1}{2}$, and an $N^{th}$ reflective element of the given set has a reflectance of 1.

Optionally, the server arrangement is configured to:
determine a region of interest of the input image, based upon the predicted gaze position and the predicted gaze direction;
generate the first image in a manner that the first image corresponds to a region of the input image that includes and surrounds the region of interest;
detect whether or not the predicted gaze position and the predicted gaze direction correspond exactly to a first region of an image plane whereat any one of the plurality of projections of the second image would be incident;
when it is detected that the predicted gaze position and the predicted gaze direction correspond exactly to the first region of the image plane, generate the second image in a manner that the second image corresponds to the region of interest; and
when it is detected that the predicted gaze position and the predicted gaze direction does not correspond exactly to the first region of the image plane, generate the second image by:
cropping a portion of the input image that includes the region of interest;
padding the cropped portion of the input image to generate an intermediate image; and
processing the intermediate image by dividing the intermediate image into a plurality of portions and reorganizing the plurality of portions to generate the second image, based on a second region of the image plane which corresponds to the predicted gaze position and the predicted gaze direction.

Optionally, when processing the intermediate image, the server arrangement is configured to:
divide the intermediate image into two portions when two of the plurality of projections of the second image would be incident at the second region of the image plane, and swap positions of the two portions; or
divide the intermediate image into four portions when four of the plurality of projections of the second image would be incident at the second region of the image plane, and diagonally swap positions of the four portions.

It will be appreciated that when it is detected that the predicted gaze position and the predicted gaze direction correspond exactly to the first region of the image plane, the portion of the plurality of projections of the second image corresponds to exactly one projection of the second image among the plurality of projections of the second image. Therefore, the portion of the plurality of projections represents the second image in the same form as the form in which the second image is displayed at the second light source. Optionally, in such a case, the server arrangement is configured to: crop the input image to obtain a portion that includes the region of interest; and pad the cropped portion of the input image to generate the second image.

It will also be appreciated that when it is detected that the predicted gaze position and the predicted gaze direction does not correspond exactly to the first region of the image plane, the portion of the plurality of projections of the second image corresponds to portions of at least two projections of the second image among the plurality of projections of the second image. In such a case, the portion of the plurality of projections of the second image represents the second image in a jumbled (namely, disordered) form. As a result, at the image plane, the region of interest would be produced in a muddled-up form that is different from the way the second image was displayed at the second light source. Therefore, in such a case, the second image is generated in a specific layout (based on the predicted gaze position and the predicted gaze direction) by employing the intermediate image to ensure that the region of interest is produced in a required ordered from.

Throughout the present disclosure, the term "optical shutter or mask" refers to an element that is controllable to selectively pass through itself only a specific portion of light incident thereupon, whilst blocking a remaining portion of the light incident thereupon. Optionally, the processor is configured to make the adjustment in the configuration to allow only the portion of the plurality of projections of the second image corresponding to the predicted gaze position and the predicted gaze direction to pass through the at least one optical shutter or mask. The remaining portion of the plurality of projections of the second image is blocked by the at least one optical shutter or mask and is not passed therethrough. It will be appreciated that the predicted gaze position and the predicted gaze direction would keep changing as the user views the visual scene. Accordingly, the portion of the plurality of projections of the second image that is to be passed through the at least one optical shutter or mask would also keep changing. In this way, the display apparatus emulates foveation characteristics of the human visual system. Optionally, the processor makes the adjustment in the configuration by providing an electrical control signal to the at least one optical shutter or mask. It will be appreciated that such a manner of making adjustment of the at least one optical shutter or mask may not require movement of the at least one light source or the at least one optical element.

Optionally, the optical shutter or mask is implemented by way of a spatial light modulator. The processor controls the spatial light modulator by way of the electrical control signal, to allow or block passage of light through the spatial light modulator. Examples of the spatial light modulator include, but are not limited to, a Digital Micromirror Device®, a Liquid Crystal on Silicon (LCoS)-based display, a Ferroelectric Liquid Crystal on Silicon (FLCoS)-based display, and a nematic liquid crystal-based display. Alternatively, optionally, the optical shutter or mask is implemented by way of a Liquid Crystal (LC) shutter matrix. The LC shutter matrix comprises a plurality of LCDs which are controllable to toggle between an open state and a closed state by application of a control signal. In the open state, a given LCD is transparent and allows light to pass therethrough. Alternatively, in the closed state, the given LCD is opaque and blocks light from passing therethrough. It will be appreciated that sizes of the plurality of LCDs in the LC shutter matrix are to be selected such that the smallest addressable portion of the plurality of projections of the second image is incident upon a single LCD. As an example, each LCD in the LC shutter matrix has dimensions that are suitable to receive light rays emanating from only a single pixel of the at least one second light source. This allows for greater control in selectively allowing only the portion of the plurality of projections of the second image to pass through the optical shutter or mask.

Optionally, the display apparatus further comprises at least one additional optical element. The at least one additional optical element may be employed for at least one of: adjusting optical paths of the plurality of projections of the second image in a manner that the plurality of projections of the second image are parallel, optically combining the projection of the first image with the portion of the plurality of projections of the second image that passes through the at least one optical shutter. Optionally, the at least one additional optical element is implemented by way of at least one of: a lens, a mirror, a semi-transparent mirror, a semi-transparent film, a semi-transparent flexible membrane, a prism, a lens, a beam splitter, an optical waveguide, a polarizer, an array of micro-prisms.

In yet another embodiment, the at least one image is a distorted image comprising a first portion and a second portion, wherein the at least one optical element comprises a first optical portion and a second optical portion having different optical properties with respect to magnification, wherein the adjustment is made by rotating the at least one optical element, based on the predicted gaze position and the predicted gaze direction, to align the first optical portion and the second optical portion with the first portion and the second portion of the distorted image, whereby a projection of the first portion and a projection of the second portion of the distorted image are differently magnified by the first optical portion and the second optical portion, respectively, to produce a visual scene that has a spatially-variable angular resolution and that appears undistorted to the user.

Optionally, the server arrangement is configured to:
determine a region of interest of the input image, based upon the predicted gaze position and the predicted gaze direction; and
generate the distorted image in a manner that the second portion of the distorted image corresponds to the region of interest of the input image, while the first portion of the distorted image corresponds to a region surrounding the region of interest in the input image.

Optionally, the server arrangement is configured to employ an imaging unit to generate the distorted image, based at least on the predicted gaze position and the predicted gaze direction. In some implementations, the imaging unit employs computer graphics to generate the input image that is distorted. In other implementations, the imaging unit captures the input image that is distorted, while the server arrangement processes the distorted input image to generate the distorted image. Optionally, in such a case, the imaging unit comprises:
at least one camera for capturing an image of a given real-world scene; and at least one distorting optical element arranged on an optical path of a projection of a given real-world scene, the at least one distorting optical element comprising a first distorting portion and a second distorting portion, wherein optical properties of the first and second distorting portions of the at least one distorting optical element are inverse of optical properties of the first and second optical portions of the at least one optical element, respectively. By "inverse", it is meant that the first and second portions of the distorted image (that were generated using the first and second distorting portions), can be optically undistorted by the first and second optical portions of the at least one optical element, to produce the visual scene.

The at least one camera could be implemented on a remote device (for example, such as a robot, a drone, a vehicle or similar). Optionally, when controlling the imaging unit to generate the distorted image, the server arrangement is configured to:

determine a first region and a second region of the given real-world scene, based at least on the predicted gaze position and the predicted gaze direction; and control at least one actuator to adjust a position and/or orientation of the at least one camera and/or the at least one distorting optical element in a manner that projections of the first region and the second region of the given real-world scene are magnified differently by the first distorting portion and the second distorting portion of the at least one distorting optical element, respectively.

Optionally, the first region and the second region of the given real-world scene are determined based also on the predicted position and the predicted orientation of the display apparatus.

Optionally, a number of pixels employed for capturing a particular angular width (namely, the PPD) of the second region of the given real-world scene is greater than a number of pixels employed for capturing that particular angular width (namely, the PPD) of the first region of the given real-world scene. Optionally, the first portion of the distorted image corresponds to the first region of the given real-world scene, whereas the second portion of the distorted image corresponds to the second region of the given real-world scene. Optionally, when the distorted image is displayed, the distorted image has a same angular resolution across an image rendering surface of the at least one light source. In other words, the first portion and the second portion of the distorted image have the same angular resolution.

The "at least one optical element" refers to a set of one or more optical elements (for example, such as lenses, mirrors, prisms, and similar) that is capable of differently magnifying projections passing therethrough or reflecting therefrom. By the phrase "different optical properties with respect to magnification", it is meant that the first optical portion and the second optical portion have different magnification and/or de-magnification properties, and are capable of selectively magnifying and/or de-magnifying projections of different portions of the distorted image. The first optical portion and the second optical portion of the at least one optical element differently magnify the projection of the first portion and the projection of the second portion of the distorted image, respectively. By the phrase "differently magnified", any of the following is meant:

the second optical portion would de-magnify the projection of the second portion of the distorted image, while the first optical portion would magnify the projection of the first portion of the distorted image;

both the first optical portion and the second optical portion would de-magnify the projections of the first portion and the second portion of the distorted image, respectively, wherein a de-magnification power of the second optical portion is greater than a de-magnification power of the first optical portion;

the second optical portion would de-magnify the projection of the second portion of the distorted image, while the first optical portion would neither magnify nor de-magnify the projection of the first portion of the distorted image;

the second optical portion would neither magnify nor de-magnify the projection of the second portion of the distorted image, while the first optical portion would magnify the projection of the first portion of the distorted image; or both the first optical portion and the second optical portion would magnify the projections of the first portion and the second portion of the distorted image, respectively, wherein a magnification power of the first optical portion is greater than a magnification power of the second optical portion.

Herein, the term "magnification power" refers to an extent to which a given portion of the distorted image would appear enlarged when viewed through a given optical portion of the at least one optical element, while the term "de-magnification power" refers to an extent to which a given portion of the distorted image would appear shrunk when viewed through a given optical portion of the at least one optical element.

Optionally, the at least one optical element is asymmetrical with respect to its optical axis. In such a case, the first optical portion and the second optical portion are positioned asymmetrically with respect to an optical centre of the at least one optical element. Alternatively, optionally, the at least one optical element is symmetrical with respect to its optical axis. In such a case, the second optical portion surrounds an optical centre of the at least one optical element, while the first optical portion surrounds the second optical portion. Moreover, in such a case, the first optical portion and the second optical portion are concentric to each other.

Optionally, the at least one optical element is implemented as at least one of: a configuration of lenses, mirrors and/or prisms, a single lens having a complex shape (for example, such as an aspheric shape), a single mirror having a complex shape (for example, such as an aspheric shape). Optionally, the single lens is implemented as any of: a Fresnel lens, a Liquid Crystal (LC) lens or a liquid lens.

Optionally, the processor is configured to make the adjustment in the configuration by controlling at least one actuator to rotate the at least one optical element, based on the predicted gaze position and the predicted gaze direction. Here, the term "rotation" refers to a complete rotation (namely, a 360-degrees rotation) made by the at least one optical element about an axis of rotation. As an example, the at least one actuator may rotate the at least one optical element by applying a mechanical torque to the at least one optical element. Additionally, optionally, the at least one actuator is controlled to tilt and/or translate the at least one optical element with respect to the at least one light source, based on the predicted gaze position and the predicted gaze direction.

When the at least one optical element is asymmetrical about its optical axis—if the at least one optical element is rotatable in only one direction, its angle of rotation lies within a range of 0 degrees to 360 degrees; otherwise, if the at least one optical element is rotatable in both the directions, its angle of rotation lies within a range of 0 degrees to 180 degrees. Alternatively, when the at least one optical element is symmetrical about its optical axis—if the at least one optical element is rotatable in only one direction, its angle of rotation lies within a range of 0 degrees to 180 degrees; otherwise, if the at least one optical element is rotatable in both the directions, its angle of rotation lies within a range of 0 degrees to 90 degrees.

Optionally, the processor is configured to determine the time period required for the adjustment and employ the determined time period in determining whether or not the portion of at least one previous image is to be displayed during the adjustment, wherein the time period required for the adjustment depends on:
- a given rotational speed of the at least one optical element,
- a direction of rotation of the at least one optical element, and
- a previous rotational orientation of the at least one optical element.

Optionally, upon making the adjustment, the first optical portion and the second optical portion of the at least one optical element is aligned with the first portion and the second portion of the distorted image. Therefore, the projections of the first portion and the second portion of the distorted image are differently magnified by the first optical portion and second optical portion, to produce the undistorted image having a first undistorted portion and a second undistorted portion, respectively. The undistorted image forms the visual scene having the spatially-variable angular resolution. The angular resolution of the visual scene (and specifically, of the undistorted image) varies spatially as an angular resolution of the second undistorted portion of the undistorted image is greater than an angular resolution of the first undistorted portion of the undistorted image. Optionally, the angular resolution of the second undistorted portion of the undistorted image is greater than or equal to twice the angular resolution of the first undistorted portion of the undistorted image.

The term "resolution" or "angular resolution" of a given image or its portion refers to a number of pixels per degree (namely, points per degree (PPD)) of an angular width of the given image or its portion, wherein the angular width is measured from the perspective of the user's eye. Notably, an increase in the resolution results in an increase in the number of pixels per degree and a decrease in an angular pixel size.

Optionally, an angular width of the first image or the first undistorted portion of the undistorted image lies in a range of 40 degrees to 220 degrees, while an angular width of the second image or the second undistorted portion of the undistorted image lies in a range of 5 degrees to 60 degrees. For example, the angular width of the first image or the first undistorted portion may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Likewise, the angular width of the second image or the second undistorted portion may be from 5, 10, 15, 20, 25, 30, 35, 40, 45, 50 or 55 degrees up to 10, 15, 20, 25, 30, 35, 40, 45, 50, 55 or 60 degrees. Herein, the term "angular width" refers to an angular width of a given image or a given portion of an image with respect to the perspective of the user's eye, namely with respect to a centre of the user's gaze.

Furthermore, the present disclosure also relates to the method as described above. Various embodiments and variants disclosed above apply mutatis mutandis to the method.

Optionally, the method further comprises:
- predicting a gaze position, a gaze direction, a gaze velocity and a gaze acceleration per eye of the user for a time instant at which the at least one image is to be displayed, based on newly-collected gaze-tracking data;
- predicting a position, an orientation, a velocity and an acceleration of the display apparatus for the time instant at which the at least one image is to be displayed, based on newly-collected pose-tracking data; and
- post-processing the at least one image prior to displaying via the at least one light source, based on the predicted gaze position, the predicted gaze direction, the predicted gaze velocity and the predicted gaze acceleration, and the predicted position, the predicted orientation, the predicted velocity and the predicted acceleration of the display apparatus.

According to an embodiment, the at least one image comprises a first image having a first resolution and a second image having a second resolution, the second resolution being higher than the first resolution, the at least one light source comprising a first light source and a second light source, the at least one optical element being implemented as at least one optical combiner,
wherein the method further comprises determining, based on the predicted gaze position and the predicted gaze direction, a region of the at least one optical combiner onto which a projection of the second image emanating from the second light source is to be focused, wherein the step of making the adjustment is performed to focus the projection of the second image on said region of the at least one optical combiner, whereby a projection of the first image emanating from the first light source superimposes with the projection of the second image to present a visual scene to the user.

According to another embodiment, the at least one image comprises a first image having a first resolution and a second image having a second resolution, the second resolution being higher than the first resolution, the at least one light source comprising a first light source and a second light source, wherein the at least one optical element is implemented as at least one optical shutter or mask,
wherein the step of making the adjustment comprises electrically controlling the at least one optical shutter or mask to selectively allow a portion of a plurality of projections of the second image emanating from the second light source to pass therethrough, based on the predicted gaze position and the predicted gaze direction, whereby said portion of the plurality of projections of the second image superimposes with a projection of the first image emanating from the first light source to present a visual scene to the user.

According to yet another embodiment, the at least one image is a distorted image comprising a first portion and a second portion, wherein the at least one optical element comprises a first optical portion and a second optical portion having different optical properties with respect to magnification,
wherein the step of making the adjustment comprises rotating the at least one optical element, based on the predicted gaze position and the predicted gaze direction, to align the first optical portion and the second optical portion with the first portion and the second portion of the distorted image, whereby a projection of the first portion and a projection of the second portion of the distorted image are differently magnified by the first optical portion and the second optical portion, respectively, to produce a visual scene that has a spatially-variable angular resolution and that appears undistorted to the user.

Furthermore, the present disclosure also relates to the system as described above. Various embodiments and variants disclosed above apply mutatis mutandis to the system.

Optionally, the server arrangement is configured to predict the gaze position, the gaze direction, the gaze velocity and the gaze acceleration, and the position, the orientation, the velocity and the acceleration of the display apparatus, based on information pertaining to a visual scene being presented to the user. Optionally, the information pertaining to the visual scene comprises information indicative of a location of an object present in the visual scene that has at least one of: an audio feature of interest, a visual feature of interest, a physical interaction with another object present in the visual scene. The object that has at least one audio features of interest, visual features of interest, physical interactions with other objects, and similar, is highly likely to attract the user's attention. Therefore, the location of such an object can be beneficially utilized by the server arrangement to predict how the user's eyes and head (on which the user wears the display apparatus) would react whilst viewing the visual scene. Optionally, to recognize at least one object present in the visual scene, the server arrangement employs at least one computer vision algorithm. The information pertaining to the visual scene enables the server arrangement in making intelligent and accurate predictions of the gaze position, the gaze direction, the gaze velocity and the gaze acceleration, and the position, the orientation, the velocity and the acceleration of the display apparatus. It will be appreciated that the term "object" encompasses both virtual objects (namely, computer-generated objects) as well as actual real-world objects in the real-world environment. In an example, the server arrangement may predict the gaze position to be in a top right region of the visual scene, when the top-right region corresponds to a location of a virtual telephone having an audio feature of interest (for example, such as a ringing sound of the virtual telephone).

Optionally, when predicting the gaze position, the gaze direction, the gaze velocity and the gaze acceleration per eye of the user, the server arrangement is configured to employ a first parameterized approximation function having input parameters corresponding to the gaze information. Similarly, optionally, when predicting the position, the orientation, the velocity and the acceleration of the display apparatus, the server arrangement is configured to employ a second parameterized approximation function having input parameters corresponding to the apparatus information. Optionally, when predicting the gaze position, the gaze direction, the gaze velocity and the gaze acceleration, and the position, the orientation, the velocity and the acceleration of the display apparatus, the server arrangement is configured to employ at least one artificial intelligence algorithm. Optionally, the at least one artificial intelligence algorithm utilises neural networks and/or computer vision algorithms for making the aforesaid predictions.

Optionally, when predicting the gaze position, the gaze direction, the gaze velocity and the gaze acceleration per eye of the user, the server arrangement is configured to employ user-specific historical gaze information. Similarly, optionally, when predicting the position, the orientation, the velocity and the acceleration of the display apparatus, the server arrangement is configured to employ device-specific historical apparatus information. The user-specific historical gaze information and/or the device-specific historical apparatus information can be processed, for example, using at least one artificial intelligence algorithm, to identify patterns in the user's gaze and/or the display apparatus's pose. These patterns beneficially enhance accuracy of the predictions.

Optionally, the server arrangement obtains the input image from one of: the processor of the display apparatus, a data repository coupled in communication with the server arrangement, the aforesaid imaging unit coupled in communication with the server arrangement.

In an embodiment, the input image is processed to generate a distorted image. In another embodiment, the input image is processed to generate a plurality of images having different resolutions. Optionally, when processing the input image to generate the at least one image, the server arrangement is configured to employ at least one image processing algorithm. Optionally, the at least one image processing algorithm comprises at least one of: an image cropping algorithm, an image resizing algorithm, an image smoothening algorithm, an image sharpening algorithm, an image brightening algorithm, a color-processing algorithm, a resolution adjustment algorithm. As an example, the at least one image may be generated by cropping the input image, based on the predicted gaze information and the predicted apparatus information.

DETAILED DESCRIPTION OF THE DRAWINGS

Referring to FIG. 1, illustrated is a block diagram of an architecture of a display apparatus 100, in accordance with an embodiment of the present disclosure. The display apparatus 100 is communicably coupled with a server arrangement 102 via a data communication network 104. The display apparatus 100 comprises means 106 for tracking a user's gaze, means 108 for tracking a pose of the display apparatus 100, at least one light source (depicted as a light source 110), at least one optical element (depicted as an optical element 112), and a processor 114.

Figure 2:
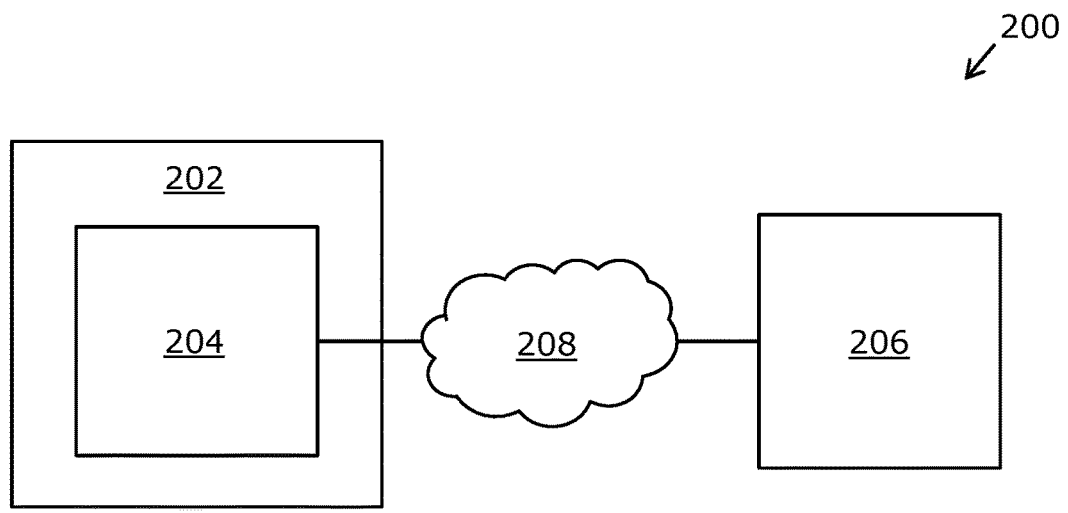
FIG. 2 is a schematic illustration of an exemplary environment wherein a system is used, in accordance with an embodiment of the present disclosure.

Referring to FIG. 2, illustrated is a schematic illustration of an exemplary environment 200 wherein a system 202 is used, in accordance with an embodiment of the present disclosure. The system 202 comprises a server arrangement 204. The server arrangement 204 is communicably coupled with a display apparatus 206 via a data communication network 208.

Figure 3:
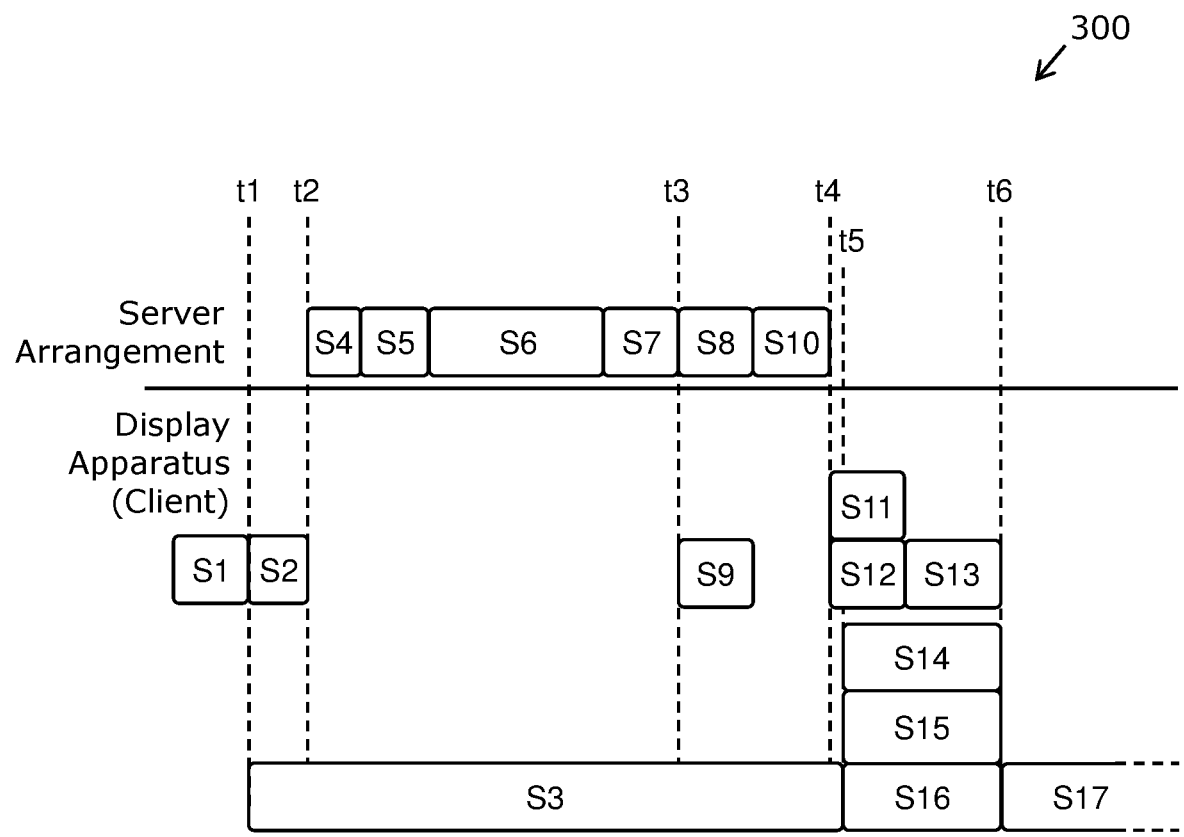
FIG. 3 is a timeline of exemplary processing tasks performed by a processor of a display apparatus and exemplary processing tasks performed by a server arrangement, in accordance with an embodiment of the present disclosure.

Referring to FIG. 3, illustrated is a timeline 300 of exemplary processing tasks performed by a processor of a display apparatus and exemplary processing tasks performed by a server arrangement, in accordance with an embodiment of the present disclosure.

Prior to time t1, the processor performs a processing task S1 which comprises: processing gaze-tracking data to determine a gaze position, a gaze direction, a gaze velocity and a gaze acceleration per eye of the user; and processing pose-tracking data to determine a position, an orientation, a velocity and an acceleration of the display apparatus.

At time t1, the processor performs a processing task S2 which is sending, to the server arrangement, gaze information indicative of the gaze position, the gaze direction, the gaze velocity and the gaze acceleration of the user, and apparatus information indicative of the position, the orientation, the velocity and the acceleration of the display apparatus. Moreover, at time t1, the processor performs another processing task S3 which is displaying at least one $N^{th}$ image via at least one light source.

At time t2, the server arrangement performs a processing task S4 of receiving, from the display apparatus, the gaze information and the apparatus information. Thereafter, the server arrangement performs a processing task S5 which comprises predicting a gaze position, a gaze direction, a gaze velocity and a gaze acceleration per eye of the user, based on the gaze information, and predicting a position, an orientation, a velocity and an acceleration of the display apparatus based on the apparatus information. Thereafter, the server arrangement performs a processing task S6 of processing an input image to generate at least one image (or at least one (N+1)$^{th}$ image), based on the predictions made at S5. Then, the server arrangement performs a processing task S7 of sending, to the display apparatus, predicted gaze information and predicted apparatus information indicative of the predictions made at S5.

Then, at time t3, the server arrangement performs a processing task S8 of either completing the processing task S6, or post processing the at least one image generated at step S6, or similar. At time t3 (or optionally after time t3), the processor performs a processing task S9 of receiving, from the server arrangement, the predicted gaze information and the predicted apparatus information. Thereafter, the server arrangement performs a processing task S10 of sending, to the display apparatus, the at least one image.

At time t4, the processor performs a processing task S11 which comprises: predicting a gaze position, a gaze direction, a gaze velocity and a gaze acceleration per eye of the user for a time instant t6 at which the at least one image is to be displayed, based on newly-collected gaze-tracking data; and predicting a position, an orientation, a velocity and an acceleration of the display apparatus for the time instant t6, based on newly-collected pose-tracking data. At time t4, the processor performs a processing task S12 of receiving, from the server arrangement, the at least one image. After completion of S11, the processor performs a processing task S13 of post-processing the at least one image prior to displaying, based on the predictions made at S11. Between time t4 and t5, the processor performs a processing task of determining whether or not a portion of at least one previous image (or the at least one N$^{th}$ image) is to be displayed during an adjustment of a configuration of the at least one light source and the at least one optical element.

At time t5, the processor performs: a processing task S14 of adjusting at least one optical element, a processing task S15 of adjusting the at least one light source, and a processing task S16 of displaying the portion of the at least one previous image via the at least one light source, when it is determined that the portion of the at least one previous image is to be displayed.

At time t6, the processor performs a processing task S17 of displaying the at least one image via the at least one light source.

It may be understood by a person skilled in the art that the timeline 300 FIG. 3 is merely an example for sake of clarity, which should not unduly limit the scope of the claims herein. The person skilled in the art will recognize many variations, alternatives, and modifications of embodiments of the present disclosure. For example, when it is determined that no portion of the at least one previous image is to be displayed, the processing task S16 may be switching off or dimming the at least one light source.

Figure 4A:
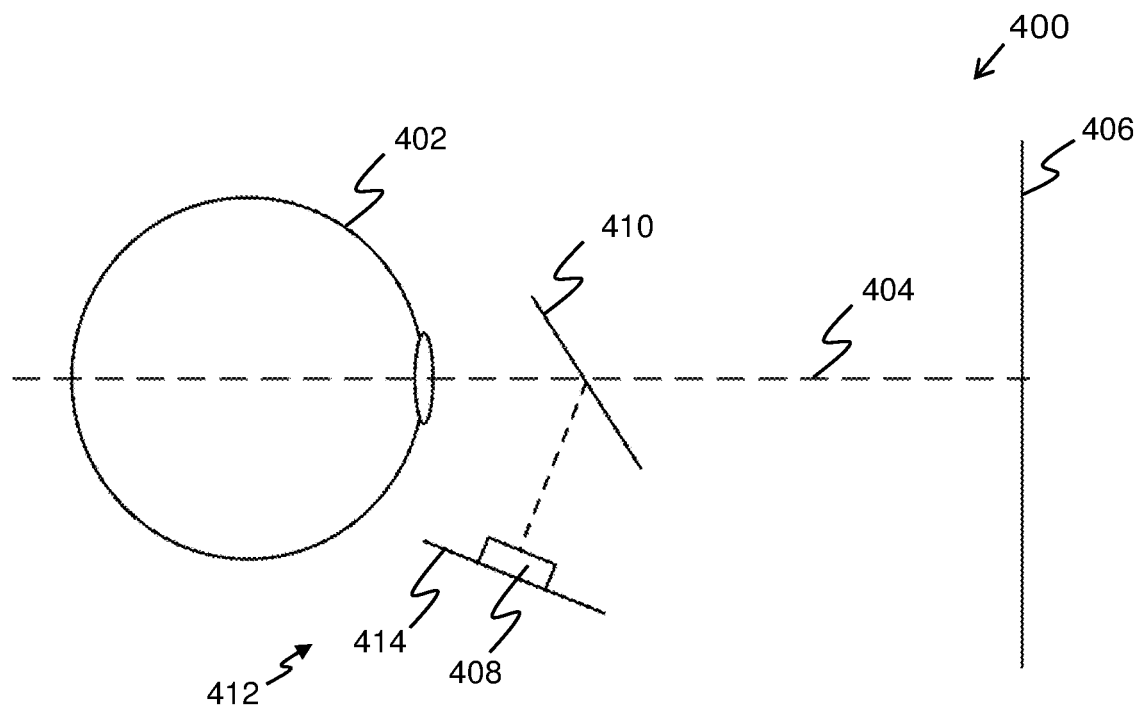
FIGS. 4A and 4B are schematic illustrations of an exemplary implementation of a display apparatus with respect to a user's eye, in accordance with an embodiment of the present disclosure.
Figure 4B:
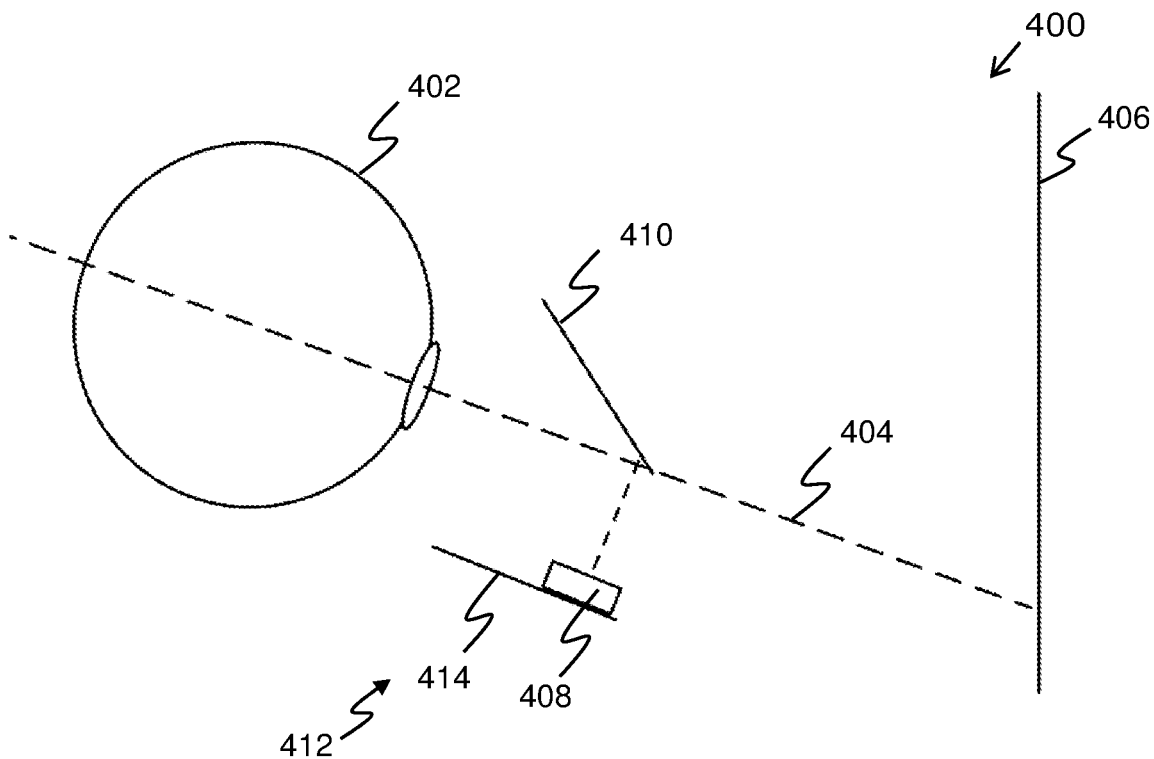

Referring to FIGS. 4A and 4B, illustrated is an exemplary implementation of a display apparatus 400 with respect to an eye 402 of a user, in accordance with an embodiment of the present disclosure. A line of sight 404 represents a gaze direction of the eye 402. The display apparatus 400 comprises a first light source 406, a second light source 408, and at least one optical combiner (depicted as an optical combiner 410). Moreover, the display apparatus 400 also comprises an image steering unit 412 comprising an actuator 414. The actuator 414 is associated with the second light source 408. A projection of a first image emanates from the first light source 406. A projection of a second image emanates from the second light source 408. The optical combiner 410 is arranged for allowing the projection of the first image to pass through, whilst reflecting the projection of the second image towards the eye 402. The projection of the first image superimposes with the projection of the second image to present a visual scene to the user. The actuator 414 mechanically adjusts (for example, by shifting) the second light source 408, to adjust a location of focusing the projection of the second image on the optical combiner 410. A processor (not shown) of the display apparatus 400 is configured to control the actuator 414 to move the second light source 408 with respect to the at least one optical combiner 410.

In FIG. 4A, the gaze direction of the eye 402 is straight, and the projection of the second image is focused on a central region of the optical combiner 410. Next, FIG. 4B depicts a sideways shift in the gaze direction of the eye 402, as compared to FIG. 4A. To adjust a configuration of the first light source 406, the second light source 408 and the optical combiner 410 according to this shift in the gaze direction, the second light source 408 is moved sideways by the actuator 414. Upon such movement, the projection of the second image is focused on a side region of the optical combiner 410.

Figure 5:
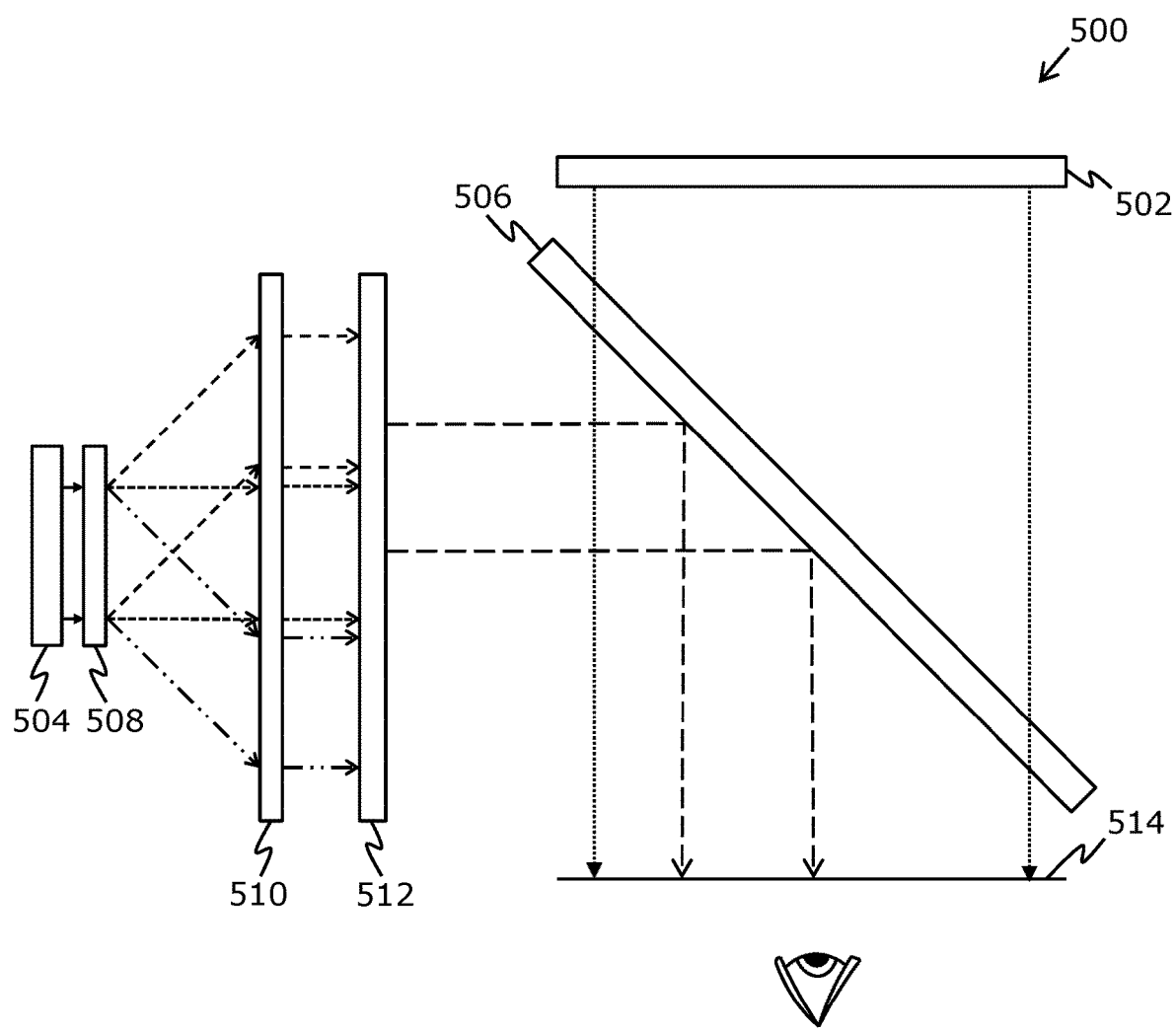
FIG. 5 is a schematic illustration of an exemplary implementation of a display apparatus, in accordance with an embodiment of the present disclosure.

Referring to FIG. 5, illustrated is a schematic illustration of an exemplary implementation of a display apparatus 500, in accordance with an embodiment of the present disclosure. The display apparatus 500 comprises a first light source 502, a second light source 504, a first additional optical element 506, an array 508 of micro-prisms, a second additional optical element 510, and an optical shutter or mask (depicted as an optical shutter 512). The array 508 of micro-prisms is arranged in a proximity of an image rendering surface of the second light source 504. The second additional optical element 510 is arranged on an optical path between the array 508 of micro-prisms and the first additional optical element 506. The optical shutter 512 is arranged on said optical path, between the second additional optical element 510 and the first additional optical element 506.

The first light source 502 is employed to display a first image and the second light source 504 is employed to display a second image. The micro-prisms of the array 508 split light (depicted as a pair of solid arrows) emanating from pixels of the second light source 504 into three directions to produce three projections of the second image. The three projections of the second image are depicted as a pair of small-dashed arrows, a pair of medium-dashed arrows, and a pair of dash-double-dot arrows. Notably, each micro-prism of the array 508 splits light emanating from at least one corresponding pixel into the three directions. The second additional optical element 510 is employed to direct the three projections of the second image towards the first additional optical element 506. An adjustment in a configuration of the first light source 502, the second light source 504 and the optical shutter 512 is made by electrically controlling the optical shutter 512 to selectively allow a portion of the three projections of the second image to pass through towards the first additional optical element 506, whilst blocking a remaining portion of the plurality of projections of the second image. The portion of the two projections of the second image that passes through the optical shutter 512 is depicted by a pair of long-dashed arrows. Said portion of the plurality of projections of the second image superimposes, at the first additional optical element 506, with a projection of the first image (depicted as a pair of dotted arrows) emanating from the first light source 502 to present a visual scene to the user. Said portion of the plurality of projections of the second image is reflected from the first additional optical element 506, whereas the projection of the first image passes through the first additional optical element 506. The visual scene is made visible to the user at an image plane 514.

Figure 6A:
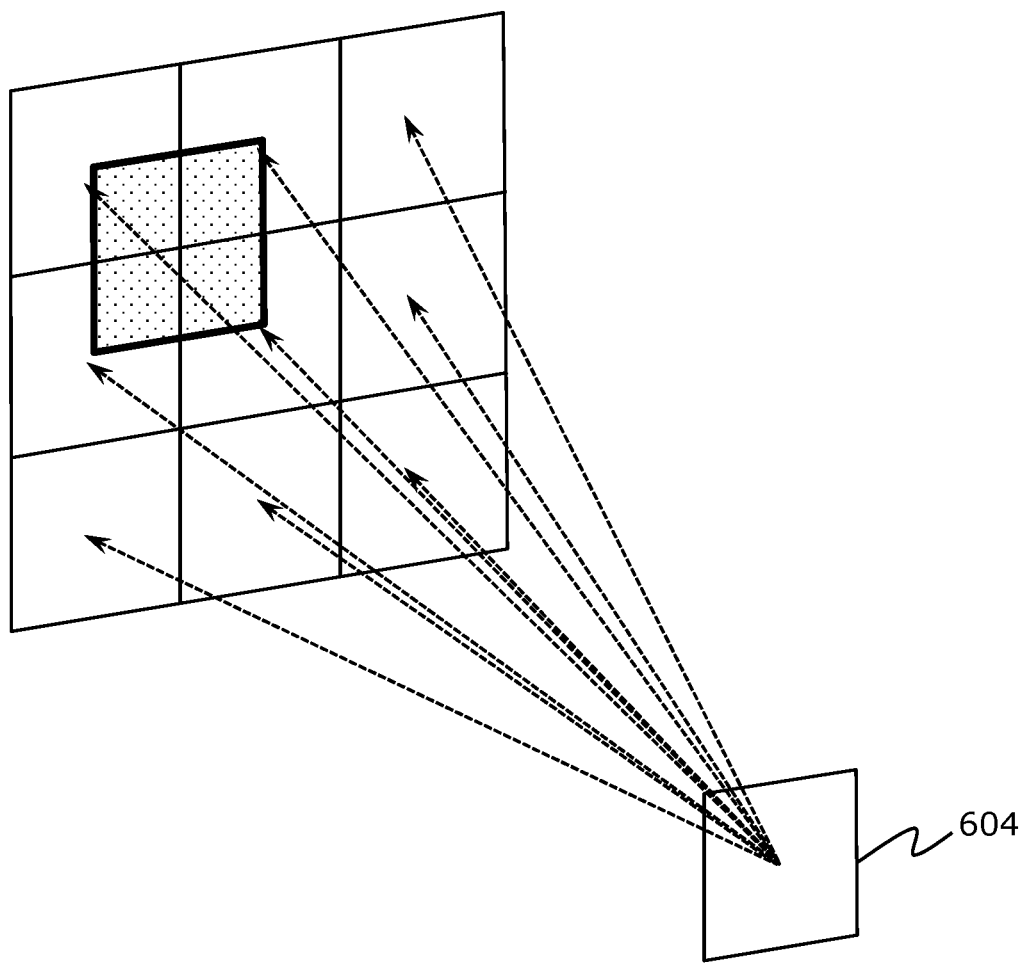
FIG. 6A illustrates an example scenario where predicted gaze position and predicted gaze direction of a user correspond to a region of an image plane whereat four of a plurality of projections of a second image would be incident.
Figure 6B:
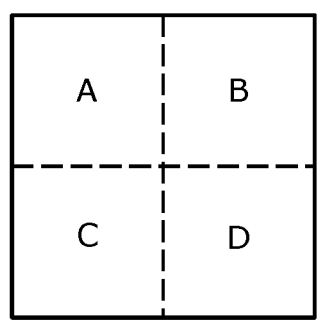
FIG. 6B illustrates an intermediate image.
Figure 6C:
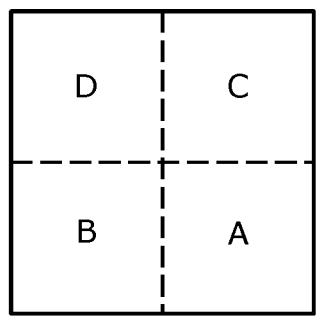
Figure 6D:
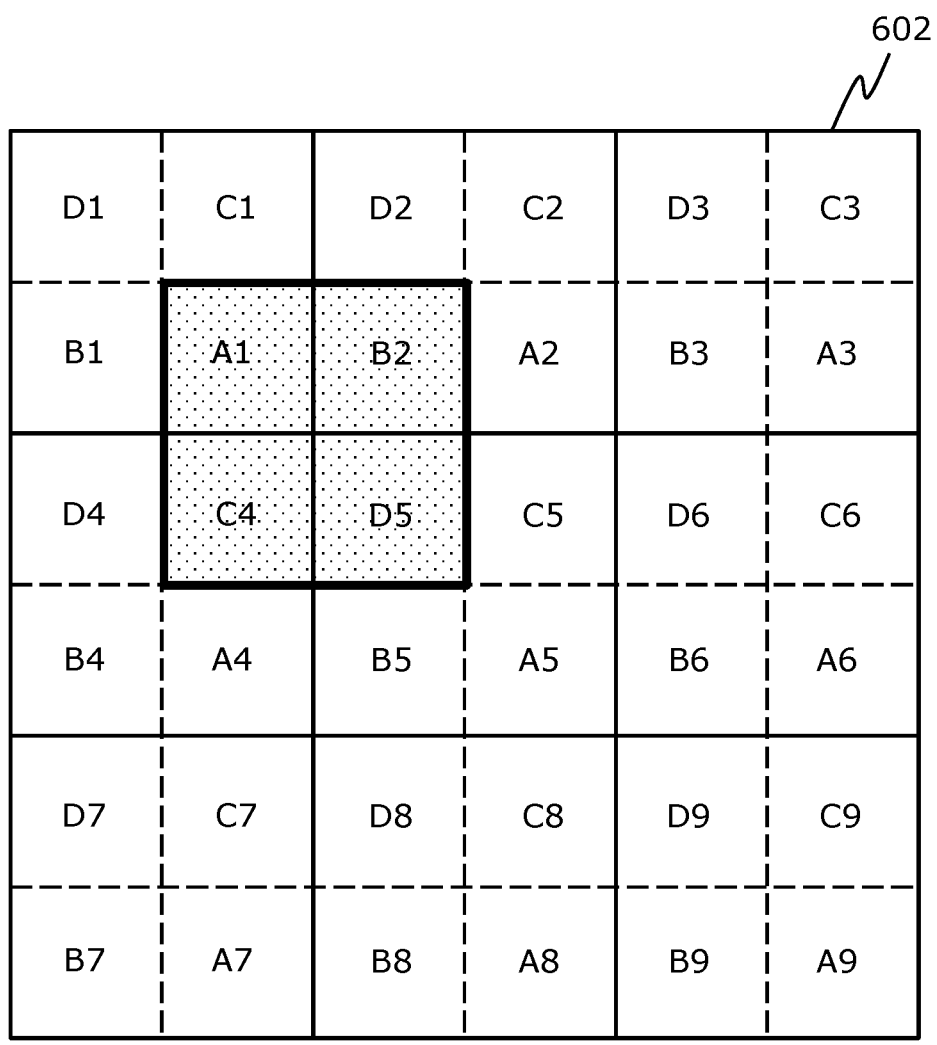
FIG. 6D illustrates an imaginary plane depicting a plurality of copies of the displayed second image, in accordance with an embodiment of the present disclosure.

Referring to FIGS. 6A, 6B, 6C and 6D, FIG. 6A illustrates an example scenario where predicted gaze position and predicted gaze direction of a user correspond to a region of an image plane whereat four of a plurality of projections of a second image would be incident, FIG. 6B illustrates an intermediate image, FIG. 6C illustrates the second image to be displayed, while FIG. 6D illustrates an imaginary plane 602 depicting a plurality of copies of the displayed second image, in accordance with an embodiment of the present disclosure.

In FIG. 6A, light emanating from a second light source 604 is shown to be split into 9 directions to produce 9 projections of the second image. Such 9 projections of the second image form 9 non-overlapping copies of the second image upon being incident on the imaginary plane 602, the imaginary plane 602 being arranged between the second light source 604 and an optical shutter or mask (not shown). Notably, a hatched region of the imaginary plane 602 corresponds to the region of the image plane whereat gaze position and gaze direction of the user is predicted to be focused.

In FIG. 6B, the intermediate image is shown to comprise four equal sized portions A, B, C, and D.

In FIG. 6C, the second image to be displayed is also shown to comprise the four equal sized portions A, B, C, and D. The second image is generated using the intermediate image. As shown, an arrangement of the portions A, B, C, and D in the second image is different from an arrangement of the portions A, B, C, and D in the intermediate image. Since the predicted gaze position and predicted gaze direction correspond to the region of the image plane whereat four of the plurality of projections of the second image would be incident, the second image is generated using the intermediate image. Notably, positions of the four portions A, B, C, and D of the intermediate image would be diagonally swapped to generate the second image. In such a case, the positions of the portions A and D are swapped with each other, and the positions of the portions B and C are swapped with each other.

In FIG. 6D, the imaginary plane 602 depicts 9 copies of the displayed second image. Different portions of four neighbouring copies of the second image lie within the hatched region of the imaginary plane 602. A portion of the plurality of projections of the second image that corresponds to said portions lying within the hatched region passes through the optical shutter or mask.

FIGS. 6A, 6B, 6C and 6D merely illustrate one example scenario, which should not unduly limit the scope of the claims herein. A person skilled in the art will recognize many variations, alternatives, and modifications of embodiments of the present disclosure. For example, light emanating from the second light source 604 may be split into 4 directions to produce 4 projections of the second image.

Figure 7A:
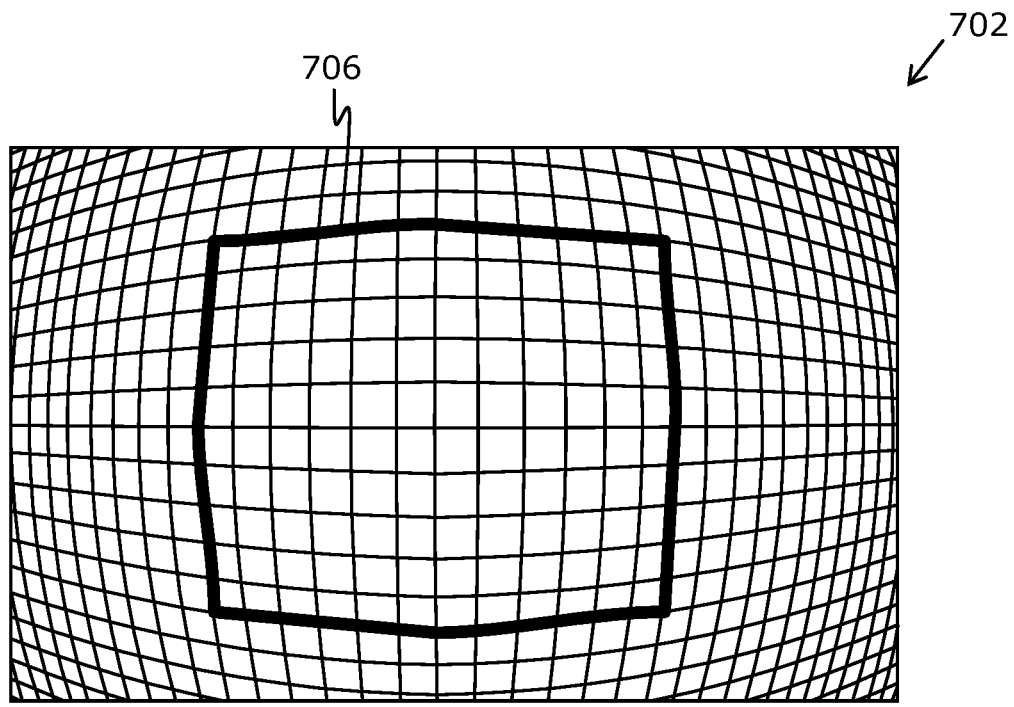
Figure 7B:
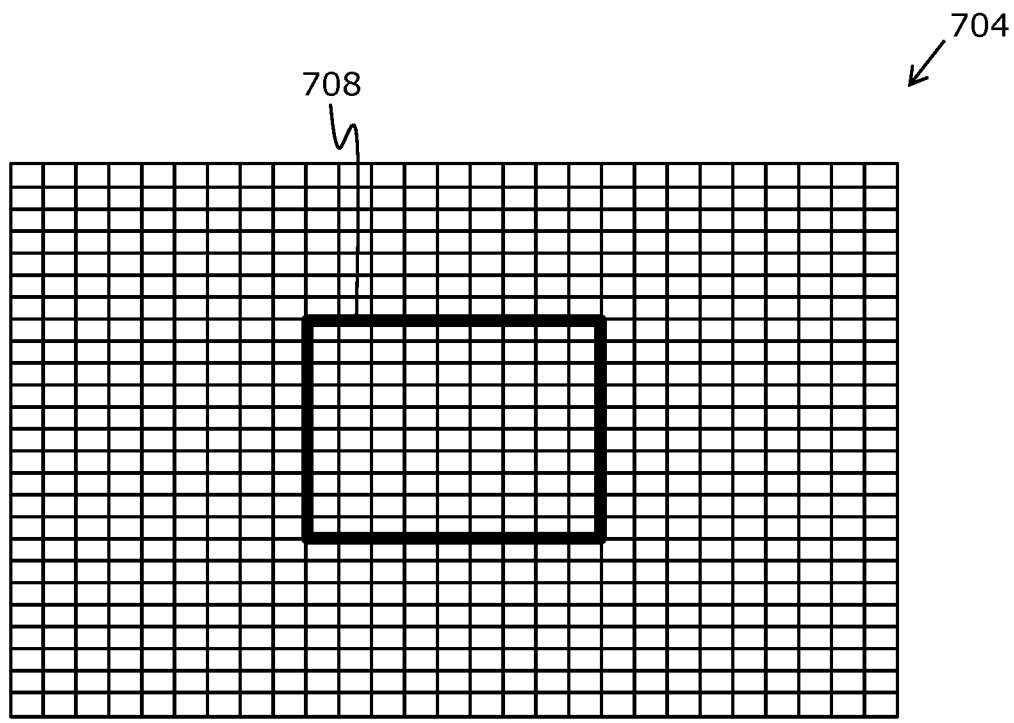
FIG. 7B is an example illustration of an undistorted image that is produced on an image plane when the distorted image is optically undistorted by at least one optical element having different optical portions, in accordance with an embodiment of the present disclosure.

Referring to FIGS. 7A and 7B, FIG. 7A is an example illustration of a distorted image 702, in accordance with an embodiment of the present disclosure; while FIG. 7B is an example illustration of an undistorted image 704 that is produced on an image plane when the distorted image 702 is optically undistorted by at least one optical element having different optical portions, in accordance with an embodiment of the present disclosure. In FIG. 7A, the distorted image 702 is shown to comprise a first portion and a second portion. For example, the second portion of the distorted image 702 lies within a boundary 706, whereas the first portion of the distorted image 702 lies between the boundary 706 and edges of the distorted image 702. In FIG. 7B, the undistorted image 704 is shown to comprise a first undistorted portion and a second undistorted portion. For example, the second undistorted portion of the undistorted image 704 lies within a boundary 708, whereas the first undistorted portion of the undistorted image 704 lies between the boundary 708 and edges of the undistorted image 704. Notably, projections of the first portion and the second portion of the distorted image 702 are differently magnified by a first optical portion and a second optical portion of the at least one optical element, respectively, to produce the undistorted image 704 on an image plane visible to a user. An angular resolution of the undistorted image 704 varies spatially as an angular resolution of the second undistorted portion of the undistorted image 704 is greater than an angular resolution of the first undistorted portion of the undistorted image 704.

Figure 8:
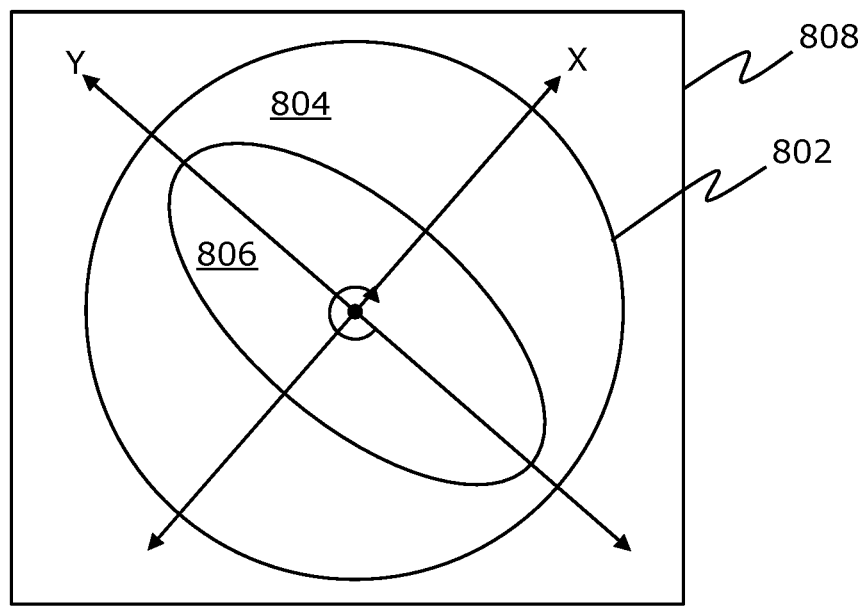
FIG. 8 is a schematic illustration of a symmetrical optical element having a first optical portion and a second optical portion, in accordance with an embodiment of the present disclosure.

Referring to FIG. 8, illustrated is a schematic illustration of a symmetrical optical element 802 having a first optical portion 804 and a second optical portion 806, in accordance with an embodiment of the present disclosure. The first optical portion 804 and the second optical portion 806 have different optical properties with respect to magnification. There is also shown an optical centre (depicted by a black dot) of the second optical portion 806, which is also a centre of rotation of the symmetrical optical element 802. Two lines representing X and Y directions pass through the centre of rotation. The symmetrical optical element 802 is rotated (namely, about the centre of rotation) with respect to an image rendering surface of a light source 808. The symmetrical optical element 802 is rotated to a given rotational orientation, such that the first optical portion 804 and the second optical portion 806 are aligned according to a predicted gaze position and a predicted gaze direction of a user.

Figure 9:
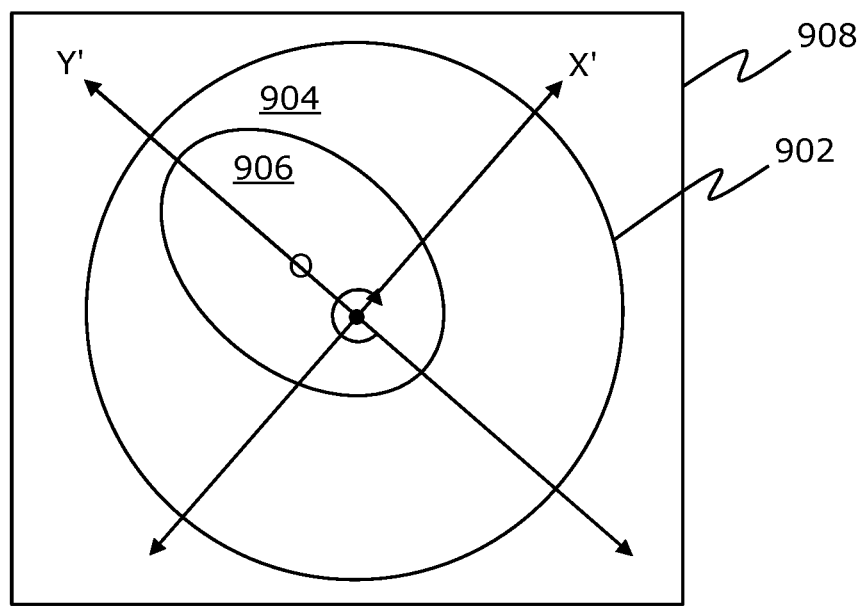
FIG. 9 is a schematic illustration of an asymmetrical optical element having a first optical portion and a second optical portion, in accordance with another embodiment of the present disclosure.

Referring next to FIG. 9, illustrated is a schematic illustration of an asymmetrical optical element 902 having a first optical portion 904 and a second optical portion 906, in accordance with an embodiment of the present disclosure. The first optical portion 904 and the second optical portion 906 have different optical properties with respect to magnification. There is also shown an optical centre 'O' of the second optical portion 906, and a centre of rotation (depicted by a black dot) of the asymmetrical optical element 902. Two lines representing X' and Y' directions pass through the centre of rotation. As the optical centre 'O' of the second optical portion 906 is not the same as the centre of rotation, the asymmetrical optical element 902 is rotated (namely, about the centre of rotation) to cover a circular area of a light source 908 using the second optical portion 906. The asymmetrical optical element 902 is rotated to a given rotational orientation, such that the first optical portion 904 and the second optical portion 906 are aligned according to a predicted gaze position and a predicted gaze direction of a user.

Figure 10A:
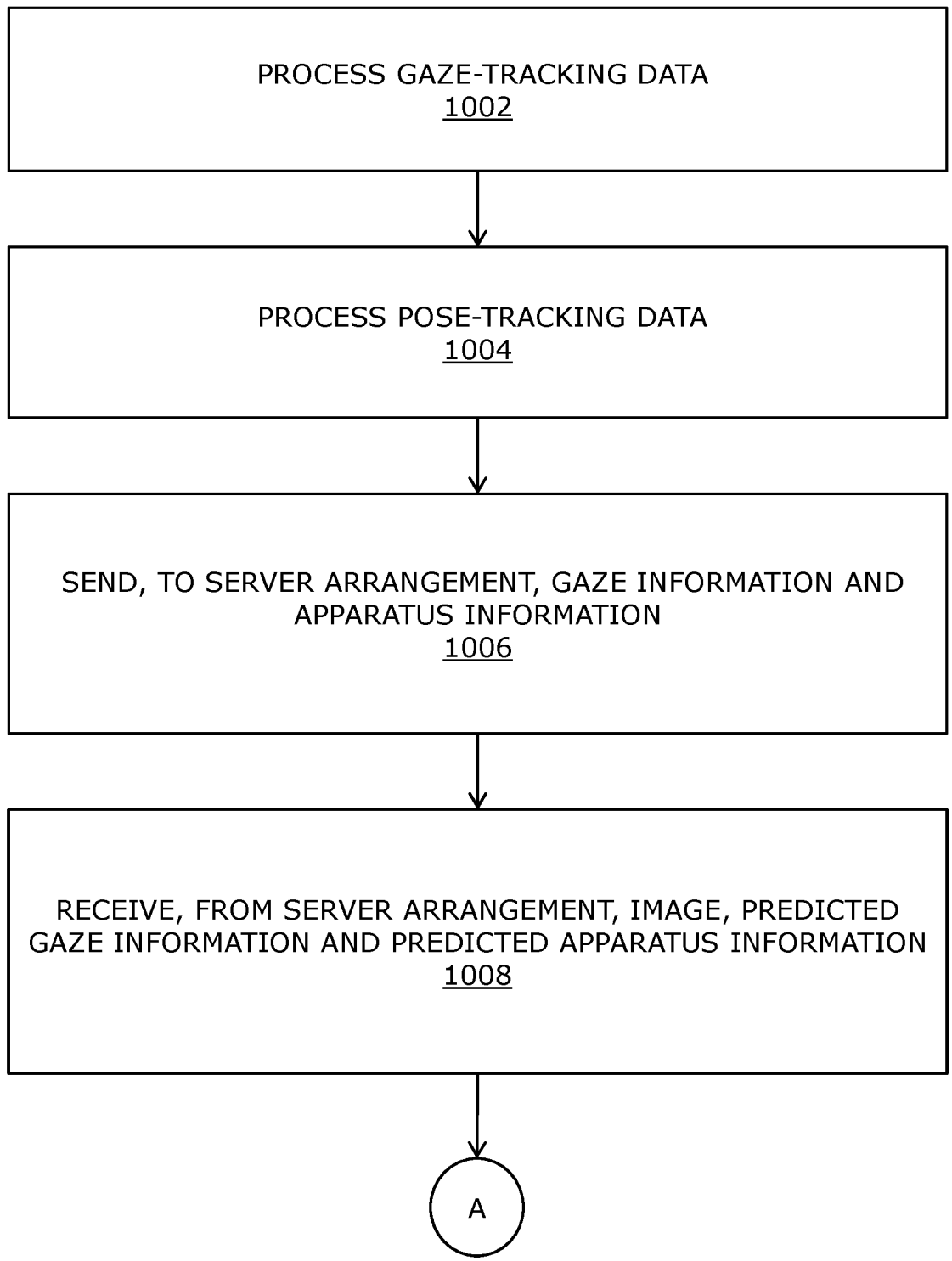
FIGS. 10A and 10B illustrate steps of a method, in accordance with an embodiment of the present disclosure.
Figure 10B:
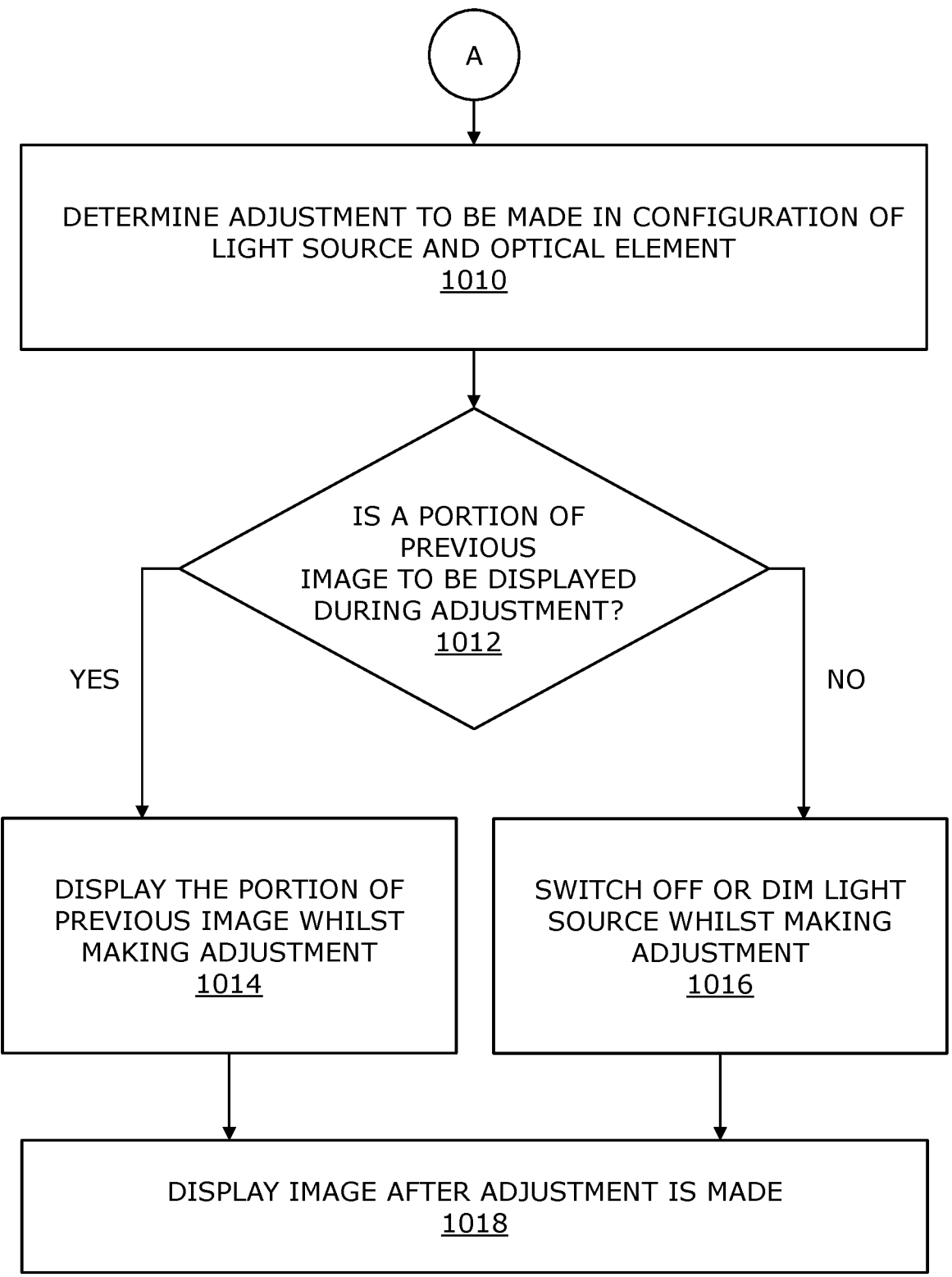

Referring to FIGS. 10A and 10B, illustrated are steps of a method, in accordance with an embodiment of the present disclosure. The method is implemented by a display apparatus that is communicably coupled with a server arrangement via a data communication network. The display apparatus comprises means for tracking a user's gaze, means for tracking a pose of the display apparatus, at least one light source and at least one optical element. At step 1002, gaze-tracking data, collected by the means for tracking the user's gaze, is processed to determine a gaze position, a gaze direction, a gaze velocity and a gaze acceleration per eye of the user. At step 1004, pose-tracking data, collected by the means for tracking the pose of the display apparatus, is processed to determine a position, an orientation, a velocity and an acceleration of the display apparatus. At step 1006, gaze information indicative of the gaze position, the gaze direction, the gaze velocity and the gaze acceleration of the user, and apparatus information indicative of the position, the orientation, the velocity and the acceleration of the display apparatus are sent to the server arrangement. The server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus. At step 1008, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus are received from the server arrangement. At step 1010, there is determined an adjustment to be made in a configuration of the at least one light source and the at least one optical element prior to displaying the at least one image, based on the predicted gaze information and the predicted apparatus information. At step 1012, it is determined whether or not a portion of at least one previous image is to be displayed during the adjustment. At step 1014, when it is determined that the portion of the at least one previous image is to be displayed, the portion of the at least one previous image is displayed via the at least one light source, whilst making the adjustment in the configuration of the at least one light source and the at least one optical element. At step 1016, when it is determined that no portion of the at least one previous image is to be displayed, the at least one light source is switched off or dimmed, whilst making the adjustment in the configuration of the at least one light source and the at least one optical element. At step 1018, the at least one image is displayed via the at least one light source after the adjustment is made.

The steps 1002, 1004, 1006, 1008, 1010, 1012, 1014, 1016, and 1018 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus, communicably coupled with a server arrangement via a data communication network, comprising:
    means for tracking a user's gaze;
    means for tracking a pose of the display apparatus;
    at least one light source;
    at least one optical element; and
    a processor configured to:
        process gaze-tracking data, collected by the means for tracking the user's gaze, to determine a gaze position, a gaze direction, a gaze velocity and a gaze acceleration per eye of the user;
        process pose-tracking data, collected by the means for tracking the pose of the display apparatus, to determine a position, an orientation, a velocity and an acceleration of the display apparatus;
        send, to the server arrangement, gaze information indicative of the gaze position, the gaze direction, the gaze velocity and the gaze acceleration of the user, and apparatus information indicative of the position, the orientation, the velocity and the acceleration of the display apparatus, wherein the server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus;
        receive, from the server arrangement, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus;
        determine an adjustment to be made in a configuration of the at least one light source and the at least one optical element prior to displaying the at least one image, based on the predicted gaze information and the predicted apparatus information;
        determine whether or not a portion of at least one previous image is to be displayed during the adjustment;
        when it is determined that the portion of the at least one previous image is to be displayed, display the portion of the at least one previous image via the at least one light source, whilst making the adjustment in the configuration of the at least one light source and the at least one optical element;
        when it is determined that no portion of the at least one previous image is to be displayed, switch off or dim the at least one light source, whilst making the adjustment in the configuration of the at least one light source and the at least one optical element; and
        display the at least one image via the at least one light source after the adjustment is made.

2. The display apparatus of claim 1, wherein the at least one image comprises a first image having a first resolution and a second image having a second resolution, the second resolution being higher than the first resolution, the at least one light source comprising a first light source and a second light source, the at least one optical element being implemented as at least one optical combiner, wherein the processor is configured to determine, based on the predicted gaze position and the predicted gaze direction, a region of the at least one optical combiner onto which a projection of the second image emanating from the second light source is to be focused, wherein the adjustment is made to focus the projection of the second image on said region of the at least one optical combiner, whereby a projection of the first image emanating from the first light source superimposes with the projection of the second image to present a visual scene to the user.

3. The display apparatus of claim 1, wherein the at least one image comprises a first image having a first resolution and a second image having a second resolution, the second resolution being higher than the first resolution, the at least one light source comprising a first light source and a second light source, wherein the at least one optical element is implemented as at least one optical shutter or mask, wherein the adjustment is made by electrically controlling the at least one optical shutter or mask to selectively allow a portion of a plurality of projections of the second image emanating from the second light source to pass therethrough, based on the predicted gaze position and the predicted gaze direction, whereby said portion of the plurality of projections of the second image superimposes with a projection of the first image emanating from the first light source to present a visual scene to the user.

4. The display apparatus of claim 1, wherein the at least one image is a distorted image comprising a first portion and a second portion, wherein the at least one optical element comprises a first optical portion and a second optical portion having different optical properties with respect to magnification, wherein the adjustment is made by rotating the at least one optical element, based on the predicted gaze position and the predicted gaze direction, to align the first optical portion and the second optical portion with the first portion and the second portion of the distorted image, whereby a projection of the first portion and a projection of the second portion of the distorted image are differently magnified by the first optical portion and the second optical portion, respectively, to produce a visual scene that has a spatially-variable angular resolution and that appears undistorted to the user.

5. The display apparatus of claim 1, wherein the processor is configured to:

predict a gaze position, a gaze direction, a gaze velocity and a gaze acceleration per eye of the user for a time instant at which the at least one image is to be displayed, based on newly-collected gaze-tracking data;

predict a position, an orientation, a velocity and an acceleration of the display apparatus for the time instant at which the at least one image is to be displayed, based on newly-collected pose-tracking data; and post-process the at least one image prior to displaying via the at least one light source, based on the predicted gaze position, the predicted gaze direction, the predicted gaze velocity and the predicted gaze acceleration, and the predicted position, the predicted orientation, the predicted velocity and the predicted acceleration of the display apparatus.

6. A method implemented by a display apparatus that is communicably coupled with a server arrangement via a data communication network, the display apparatus comprising means for tracking a user's gaze, means for tracking a pose of the display apparatus, at least one light source and at least one optical element, the method comprising:

processing gaze-tracking data, collected by the means for tracking the user's gaze, to determine a gaze position, a gaze direction, a gaze velocity and a gaze acceleration per eye of the user;

processing pose-tracking data, collected by the means for tracking the pose of the display apparatus, to determine a position, an orientation, a velocity and an acceleration of the display apparatus;

sending, to the server arrangement, gaze information indicative of the gaze position, the gaze direction, the gaze velocity and the gaze acceleration of the user, and apparatus information indicative of the position, the orientation, the velocity and the acceleration of the display apparatus, wherein the server arrangement is configured to predict a gaze position, a gaze direction, a gaze velocity and a gaze acceleration per eye of the user based on the gaze information, predict a position, an orientation, a velocity and an acceleration of the display apparatus based on the apparatus information, and process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus;

receiving, from the server arrangement, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus;

determining an adjustment to be made in a configuration of the at least one light source and the at least one optical element prior to displaying the at least one image, based on the predicted gaze information and the predicted apparatus information;

determining whether or not a portion of at least one previous image is to be displayed during the adjustment;

when it is determined that the portion of the at least one previous image is to be displayed, displaying the portion of the at least one previous image via the at least one light source, whilst making the adjustment in the configuration of the at least one light source and the at least one optical element;

when it is determined that no portion of the at least one previous image is to be displayed, switching off or dimming the at least one light source, whilst making the adjustment in the configuration of the at least one light source and the at least one optical element; and displaying the at least one image via the at least one light source after the adjustment is made.

7. The method of claim 6, wherein the at least one image comprises a first image having a first resolution and a second image having a second resolution, the second resolution being higher than the first resolution, the at least one light source comprising a first light source and a second light source, the at least one optical element being implemented as at least one optical combiner, wherein the method further comprises determining, based on the predicted gaze position and the predicted gaze direction, a region of the at least one optical combiner onto which a projection of the second image emanating from the second light source is to be focused, wherein the step of making the adjustment is performed to focus the projection of the second image on said region of the at least one optical combiner, whereby a projection of the first image emanating from the first light source superimposes with the projection of the second image to present a visual scene to the user.

8. The method of claim 6, wherein the at least one image comprises a first image having a first resolution and a second image having a second resolution, the second resolution being higher than the first resolution, the at least one light source comprising a first light source and a second light source, wherein the at least one optical element is implemented as at least one optical shutter or mask, wherein the step of making the adjustment comprises electrically controlling the at least one optical shutter or mask to selectively allow a portion of a plurality of projections of the second image emanating from the second light source to pass therethrough, based on the predicted gaze position and the predicted gaze direction, whereby said portion of the plurality of projections of the second image superimposes with a projection of the first image emanating from the first light source to present a visual scene to the user.

9. The method of claim 6, wherein the at least one image is a distorted image comprising a first portion and a second portion, wherein the at least one optical element comprises a first optical portion and a second optical portion having different optical properties with respect to magnification, wherein the step of making the adjustment comprises rotating the at least one optical element, based on the predicted gaze position and the predicted gaze direction, to align the first optical portion and the second optical portion with the first portion and the second portion of the distorted image, whereby a projection of the first portion and a projection of the second portion of the distorted image are differently magnified by the first optical portion and the second optical portion, respectively, to produce a visual scene that has a spatially-variable angular resolution and that appears undistorted to the user.

10. The method of claim 6, further comprising:
predicting a gaze position, a gaze direction, a gaze velocity and a gaze acceleration per eye of the user for a time instant at which the at least one image is to be displayed, based on newly-collected gaze-tracking data;
predicting a position, an orientation, a velocity and an acceleration of the display apparatus for the time instant at which the at least one image is to be displayed, based on newly-collected pose-tracking data; and
post-processing the at least one image prior to displaying via the at least one light source, based on the predicted gaze position, the predicted gaze direction, the predicted gaze velocity and the predicted gaze acceleration, and the predicted position, the predicted orientation, the predicted velocity and the predicted acceleration of the display apparatus.

11. A system comprising a server arrangement communicably coupled with a display apparatus via a data communication network, the display apparatus comprising means for tracking a user's gaze, means for tracking a pose of the display apparatus, at least one light source, at least one optical element and a processor, wherein the processor is configured to process gaze-tracking data to determine a gaze position, a gaze direction, a gaze velocity and a gaze acceleration per eye of the user, and process pose-tracking data to determine a position, an orientation, a velocity and an acceleration of the display apparatus, wherein the server arrangement is configured to:

receive, from the display apparatus, gaze information indicative of the gaze position, the gaze direction, the gaze velocity and the gaze acceleration of the user, and apparatus information indicative of the position, the orientation, the velocity and the acceleration of the display apparatus;
predict a gaze position, a gaze direction, a gaze velocity and a gaze acceleration per eye of the user, based on the gaze information;
predict a position, an orientation, a velocity and an acceleration of the display apparatus based on the apparatus information;
process an input image to generate at least one image, based on the predicted gaze position, the predicted gaze direction, the predicted gaze velocity and the predicted gaze acceleration, and the predicted position, the predicted orientation, the predicted velocity and the predicted acceleration of the display apparatus; and
send, to the display apparatus, the at least one image, predicted gaze information indicative of the predicted gaze position, the predicted gaze direction, the predicted gaze velocity and the predicted gaze acceleration, and predicted apparatus information indicative of the predicted position, the predicted orientation, the predicted velocity and the predicted acceleration of the display apparatus, wherein the processor of the display apparatus is configured to:
determine an adjustment to be made in a configuration of the at least one light source and the at least one optical element prior to displaying the at least one image, based on the predicted gaze information and the predicted apparatus information;
determine whether or not a portion of at least one previous image is to be displayed during the adjustment;
when it is determined that the portion of the at least one previous image is to be displayed, display the portion of the at least one previous image via the at least one light source, whilst making the adjustment in the configuration of the at least one light source and the at least one optical element;
when it is determined that no portion of the at least one previous image is to be displayed, switch off or dim the at least one light source, whilst making the adjustment in the configuration of the at least one light source and the at least one optical element; and
display the at least one image via the at least one light source after the adjustment is made.

12. The system of claim 11, wherein the at least one image comprises a first image having a first resolution and a second image having a second resolution, the second resolution being higher than the first resolution, the at least one light source comprising a first light source and a second light source, the at least one optical element being implemented as at least one optical combiner, wherein the processor is configured to determine, based on the predicted gaze position and the predicted gaze direction, a region of the at least one optical combiner onto which a projection of the second image emanating from the second light source is to be focused, wherein the adjustment is made to focus the projection of the second image on said region of the at least one optical combiner, whereby a projection of the first image emanating from the first light source superimposes with the projection of the second image to present a visual scene to the user.

13. The system of claim 11, wherein the at least one image comprises a first image having a first resolution and a second image having a second resolution, the second resolution being higher than the first resolution, the at least one light source comprising a first light source and a second light source, wherein the at least one optical element is implemented as at least one optical shutter or mask, wherein the adjustment is made by electrically controlling the at least one optical shutter or mask to selectively allow a portion of a plurality of projections of the second image emanating from the second light source to pass therethrough, based on the predicted gaze position and the predicted gaze direction, whereby said portion of the plurality of projections of the second image superimposes with a projection of the first image emanating from the first light source to present a visual scene to the user.

14. The system of claim 11, wherein the at least one image is a distorted image comprising a first portion and a second portion, wherein the at least one optical element comprises a first optical portion and a second optical portion having different optical properties with respect to magnification, wherein the adjustment is made by rotating the at least one optical element, based on the predicted gaze position and the predicted gaze direction, to align the first optical portion and the second optical portion with the first portion and the second portion of the distorted image, whereby a projection of the first portion and a projection of the second portion of the distorted image are differently magnified by the first optical portion and the second optical portion, respectively, to produce a visual scene that has a spatially-variable angular resolution and that appears undistorted to the user.

15. The system of claim 11, wherein the server arrangement is configured to predict the gaze position, the gaze direction, the gaze velocity and the gaze acceleration, and the position, the orientation, the velocity and the acceleration of the display apparatus, based on information pertaining to a visual scene being presented to the user.

16. The system of claim 15, wherein the information pertaining to the visual scene comprises information indicative of a location of an object present in the visual scene that has at least one of: an audio feature of interest, a visual feature of interest, a physical interaction with another object present in the visual scene.

* * * * *